United States Patent
Kamoto

(10) Patent No.: US 8,436,786 B2
(45) Date of Patent: May 7, 2013

(54) MULTI-SCREEN SYNCHRONIZED PLAYBACK SYSTEM, DISPLAY CONTROL TERMINAL, MULTI-SCREEN SYNCHRONIZED PLAYBACK METHOD, AND PROGRAM

(75) Inventor: Satoru Kamoto, Tokyo (JP)

(73) Assignee: Sony Corporation, Tokyo (JP)

( * ) Notice: Subject to any disclaimer, the term of this patent is extended or adjusted under 35 U.S.C. 154(b) by 894 days.

(21) Appl. No.: 12/593,005

(22) PCT Filed: Feb. 13, 2008

(86) PCT No.: PCT/JP2008/052286
§ 371 (c)(1),
(2), (4) Date: Sep. 25, 2009

(87) PCT Pub. No.: WO2008/126465
PCT Pub. Date: Oct. 23, 2008

(65) Prior Publication Data
US 2010/0111491 A1 May 6, 2010

(30) Foreign Application Priority Data
Mar. 30, 2007 (JP) .................................. 2007-090097

(51) Int. Cl.
*G09G 5/00* (2006.01)
(52) U.S. Cl.
USPC ................................. 345/1.1; 345/1.3; 345/90
(58) Field of Classification Search .................... None
See application file for complete search history.

(56) References Cited

U.S. PATENT DOCUMENTS

| | | | |
|---|---|---|---|
| 8,022,894 B2* | 9/2011 | Naito et al. ................. 345/2.2 |
| 2005/0168630 A1* | 8/2005 | Yamada et al. ............. 345/1.3 |
| 2005/0174482 A1 | 8/2005 | Yamada et al. | |

FOREIGN PATENT DOCUMENTS

| | | |
|---|---|---|
| JP | 11 136594 | 5/1999 |
| JP | 2004 32273 | 1/2004 |
| JP | 2004-32273 A | 1/2004 |
| JP | 2004 78414 | 3/2004 |
| JP | 2004-78414 A | 3/2004 |
| JP | 2005 244931 | 9/2005 |
| JP | 2005-244931 A | 9/2005 |
| JP | 2007-36523 A | 2/2007 |

OTHER PUBLICATIONS

Examination Report issud Oct. 26, 2010, in Singapore Application No. 2009061714, filed Feb. 13, 2008.
Supplementary European Search Report issued Jul. 24, 2012 in European Patent Application No. 08711144.9.
Office Action issued Jul. 31, 2012 in European Patent Application No. 08 711 144.9.
Office Action issued Aug. 14, 2012 in Japanese Patent Application No. 2007-090097.

* cited by examiner

*Primary Examiner* — Muhammad N Edun
(74) *Attorney, Agent, or Firm* — Oblon, Spivak, McClelland, Maier & Neustadt, L.L.P.

(57) ABSTRACT

A multi-screen synchronized playback system capable of synchronizing, with high accuracy, playback start times of content to be displayed on multiple screens. The multi-screen synchronized playback system has a plurality of display control terminals and a synchronization server connected to the plurality of display control terminals. The synchronization server includes a synchronization time transmitting section for simultaneously transmitting time information of a clock of the synchronization server to the plurality of display control devices. The display control terminal includes a time setting section for setting time on a clock of the display control terminal based on the time information simultaneously transmitted from the synchronization server, and a display control section for starting playback of content at a playback start time set for each content, based on the time on the clock of the display control terminal.

21 Claims, 13 Drawing Sheets

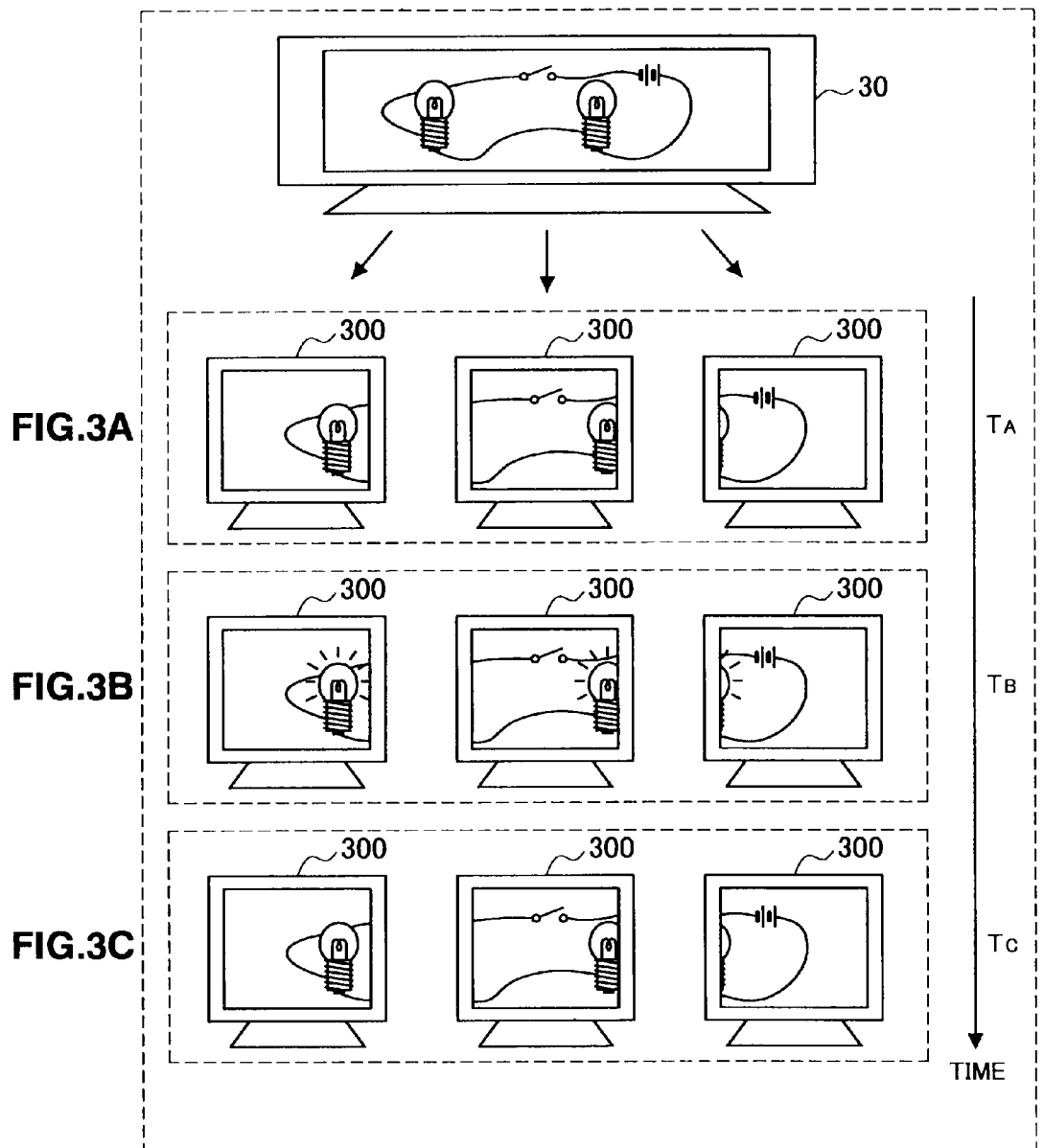

FIG.13

| SYNCHRONIZATION REQUEST MESSAGE (B) | SYNCHRONIZATION RESPONSE MESSAGE (C) |
|---|---|
| MESSAGE IDENTIFIER + CHECKSUM | MESSAGE IDENTIFIER + CHECKSUM |
| SERVER PORT | SERVER TIME |
| SERVER TIME | CLIENT TIME (BEFORE OVERWRITE) |
| | CLIENT TIME (AFTER OVERWRITE) |

MULTI-SCREEN SYNCHRONIZED PLAYBACK SYSTEM, DISPLAY CONTROL TERMINAL, MULTI-SCREEN SYNCHRONIZED PLAYBACK METHOD, AND PROGRAM

TECHNICAL FIELD

The present invention relates to a multi-screen synchronized playback system, a display control terminal, a multi-screen synchronized playback method, and a program.

BACKGROUND ART

In recent years, a multi-screen synchronized playback technology for continuously playing back high-quality moving image content or the like on multiple large screens is receiving attention. The multi-screen synchronized playback technology is a technology for combining multiple display screens and displaying them as if they are one large screen, or for controlling playback of an image as if one end of a display screen is continuous with one end of another display screen, for example. Furthermore, the multi-screen synchronized playback technology also includes a technology for simultaneously displaying the same image on multiple screens, or for controlling playback so that images simultaneously displayed on multiple screens are integrated to form a whole image.

In relation to the above-described multi-screen synchronized playback technology, the Patent Document 1 mentioned below discloses a technology for splitting a received television signal between a plurality of decoder circuits and displaying the output on multiple screens. However, a technology for providing a terminal for display control for each of a plurality of display devices and performing multi-screen synchronized playback is not disclosed therein. Furthermore, a configuration in which a general-purpose information processing apparatus is used as a terminal for display control is not disclosed therein either. Considering that multi-screen synchronized playback of content with high quality and by a display screen configured from multiple screens will become mainstream, and in light of the present situation where the configuration of a display control terminal is shifting from a dedicated terminal to a general-purpose information processing apparatus, the nature itself of a technical issue required for the multi-screen synchronized playback technology is clearly different from that of the conventional synchronized playback technology.

Incidentally, an information processing apparatus (hereinafter referred to as a "personal computer"; PC) used nowadays in a general-purpose manner is configured to be capable of being connected with a plurality of display devices. For example, by installing a display card (hereinafter referred to as a "DSP card") in each of a plurality of bus slots formed within, a plurality of display devices can be connected. In this case, it is possible to synchronize high-quality content with high accuracy and playback the content on the screen of the display device connected to each DSP card. However, the number of the display devices that can be connected to one PC is limited to several devices at the most due to a limitation imposed by hardware/software of the PC.

Accordingly, a technology is developed to synchronously playback high-quality content on a large number of display screens without being limited by the display capability of a display control terminal, by installing a plurality of display control terminals (PCs) to which a plurality of display devices are connected and performing time synchronization between the display control terminals with high accuracy. This is a technology in which, when the playback start time set for each content is reached, corresponding display control terminals simultaneously playback the content. However, when a general-purpose PC is used as the display control terminal, since the accuracy of an internal clock of the PC is extremely low, a major problem arises where synchronized playback with high accuracy cannot be realized.

[Patent document 1] JP-A-H11-136594

DISCLOSURE OF THE INVENTION

Problems to be Solved by the Invention

Accordingly, a method has been developed where time is set by using a general-purpose time synchronization technology such as Network Time Protocol (NTP) client installed on a standard operating system (UNIX (registered trademark), MS-Windows (registered trademark), etc.). However, since it is difficult to realize highly accurate time synchronization required for multi-screen synchronized playback even if time is synchronized by using the NTP client, there is a problem that the timing for starting the playback of high-quality content cannot be matched. Specifically, in a case of performing time synchronization by using the NTP client, a time difference of about 55 msec on the average between a plurality of display control terminals is confirmed. Thus, time cannot be synchronized with high accuracy between a plurality of display control terminals just by combining a normal time synchronization technology. Also, if a time server capable of highly accurate time synchronization is to be installed on each system, enormous costs will be incurred in the installation and operation of the time servers.

Thus, the present invention has been achieved in view of the above-described problems, and the object of the present invention is to provide a multi-screen synchronized playback system, a display control terminal, a multi-screen synchronized playback method, and a program that are new and improved, and that are capable of synchronizing playback start time of content to be displayed on multiple screens with low cost and high accuracy.

Means for Solving the Problems

To solve the above-described problems, according to an aspect of the present invention, there is provided a multi-screen synchronized playback system having a plurality of display control terminals and a synchronization server connected to the plurality of display control terminals. Furthermore, the synchronization server includes a synchronization time transmitting section for simultaneously transmitting time information of a clock of the synchronization server to the plurality of display control devices. Moreover, the display control terminal includes a time setting section for setting time on a clock of the display control terminal, based on the time information simultaneously transmitted from the synchronization server; and a display control section for starting playback of content at a playback start time set for each content, based on the time on the clock of the display control terminal.

Furthermore, the synchronization server may be configured to further include a time setting section for setting time on the clock of the synchronization server, based on time information received via a network.

Furthermore, the time setting section provided in the synchronization server may be configured to set time on the clock of the synchronization server, based on time information received from an NTP server located on the network.

Furthermore, the display control section provided in the display control terminal may be configured to simultaneously start playback of content which is the same as content whose playback is started by another display control terminal included in the multi-screen synchronized playback system.

Furthermore, the display control section provided in the display control terminal may be configured to prefetch, before a playback start time set for each content is reached, content corresponding to the playback start time.

Furthermore, the display control section provided in the display control terminal may be configured to end content being played back and start playback of content to be played back next at a time point a playback start time of the content to be played back next after the content being played back is reached.

Furthermore, to solve the above-described problems, according to another aspect of the present invention, there is provided a multi-screen synchronized playback system having a plurality of first display control terminals and a second display control terminal connected to the plurality of first display control terminals. Furthermore, the second display control terminal is characterized in including a display control section for starting playback of content at a playback start time set for each content, based on time on a clock of the second display control terminal; and a synchronization time transmitting section for simultaneously transmitting time information of the clock of the second display control terminal to the plurality of first display control devices. Moreover, the first display control terminal is characterized in including a time setting section for setting time on a clock of the first display control terminal based on the time information simultaneously transmitted from the second display control terminal; and a display control section for starting playback of content at the playback start time set for each content, based on the time on the clock of the first display control terminal.

Furthermore, to solve the above-described problems, according to another aspect of the present invention, there is provided a display control terminal connected to the plurality of other display control terminals. Furthermore, the display control terminal is characterized in including a display control section for starting playback of content at a playback start time set for each content, based on time on a clock of the display control terminal; and a synchronization time transmitting section for simultaneously transmitting time information of the clock of the display control terminal to the plurality of other display control devices to synchronize the time on the clock of the display control terminal and time on clocks of the plurality of other display control terminals.

Furthermore, to solve the above-described problems, according to another aspect of the present invention, there is provided a multi-screen synchronized playback system having a plurality of display control terminals and a synchronization server connected to the plurality of display control terminals.

Furthermore, the synchronization server is characterized in including a playback start signal transmitting section for simultaneously transmitting a playback start signal for each content to the plurality of display control devices at a playback start time set for each content, based on time on a clock of the synchronization server. Moreover, the display control terminal is characterized in including a display control section for starting playback of corresponding content in accordance with the playback start signal received from the synchronization server.

Furthermore, to solve the above-described problems, according to another aspect of the present invention, there is provided a multi-screen synchronized playback system having a plurality of first display control terminals and a second display control terminal connected to the plurality of first display control terminals.

Furthermore, the second display control terminal is characterized in including a display control section for starting playback of content at a playback start time set for each content, based on time on a clock of the second display control terminal; and a playback start signal transmitting section for simultaneously transmitting a playback start signal for each content to the plurality of first display control devices at the playback start time set for each content, based on the time on the clock of the second display control terminal. Moreover, the first display control terminal is characterized in including a display control section for starting playback of corresponding content in accordance with the playback start signal received from the second display control terminal.

Furthermore, to solve the above-described problems, according to another aspect of the present invention, there is provided a display control terminal connected to a plurality of other display control terminals. The display control terminal is characterized in including a display control section for starting playback of content at a playback start time set for each content, based on time on a clock of the display control terminal; and a playback start signal transmitting section for simultaneously transmitting a playback start signal for each content to the plurality of other display control devices at the playback start time set for each content, based on the time on the clock of the display control terminal.

Furthermore, to solve the above-described problems, according to another aspect of the present invention, there is provided a multi-screen synchronized playback system having a plurality of display control terminals and a synchronization server connected to the plurality of display control terminals.

Furthermore, the synchronization server is characterized in including a playback start signal transmitting section for simultaneously transmitting time information to the plurality of display control devices at a predetermined time interval, based on time on a clock of the synchronization server. Moreover, the display control terminal is characterized in including a display control section for starting playback of content at a playback start time set for each content, based on the time information received from the synchronization server.

Furthermore, to solve the above-described problems, according to another aspect of the present invention, there is provided a multi-screen synchronized playback system having a plurality of first display control terminals and a second display control terminal connected to the plurality of first display control terminals.

Furthermore, the second display control terminal is characterized in including a display control section for starting playback of content at a playback start time set for each content, based on time on a clock of the second display control terminal; and a playback start signal transmitting section for simultaneously transmitting time information to the plurality of first display control devices at a predetermined time interval, based on the time on the clock of the second display control terminal. Moreover, the first display control terminal is characterized in including a display control section for starting playback of content at the playback start time set for each content, based on the time information received from the second display control terminal.

Furthermore, to solve the above-described problems, according to another aspect of the present invention, there is provided a display control terminal connected to a plurality of other display control terminals. The display control terminal is characterized in including a display control section for starting playback of content at a playback start time set for each content, based on time on a clock of the display control terminal; and a playback start signal transmitting section for simultaneously transmitting time information to the plurality of other display control devices at a predetermined time interval, based on the time on the clock of the display control terminal.

To describe the above-described configuration in more detail, there is provided a multi-screen synchronized playback system having a plurality of display control terminals for displaying a playback image on each of a plurality of display devices, and a synchronization server, connected to the plurality of display control terminals, for synchronizing time of the plurality of display control terminals. The synchronization server may be configured to include a timer section for keeping local time on the synchronization server; a time setting section for setting time on the timer section by using time information received via a network; and a synchronization time transmitting section for simultaneously transmitting synchronization time information to the plurality of display control terminals, based on the local time on the synchronization server. Furthermore, the display control terminal may be configured to include a timer section for keeping local time on the display control terminal; a time setting section for setting time on the timer section by using the synchronization time information received from the synchronization server; and a display control section for playing back an image on the display device at a predetermined time, based on the local time on the display control terminal.

Moreover, there is provided a multi-screen synchronized playback system having a first display control terminal, connected to a plurality of second display control terminals for displaying a playback image on each of a plurality of display devices, for synchronizing time on the plurality of second display control terminals as well as for displaying a playback image on the display device. The first display control terminal may be configured to include a timer section for keeping local time on the first display control terminal; a time setting section for setting time on the timer section by using time information received via a network; a display control section for displaying an image on the display device at a predetermined time, based on the local time on the first display control terminal; and a synchronization time transmitting section for simultaneously transmitting synchronization time information to the plurality of second display control terminals, based on the local time on the first display control terminal. Furthermore, the second display control terminal may be configured to include a timer section for keeping local time on the second display control terminal; a time setting section for setting time on the timer section by using the synchronization time information received from the first display control terminal; and a display control section for playing back an image on the display device at a predetermined time, based on the local time on the second display control terminal.

Moreover, there is provided a display control terminal, connected to a display device for displaying a playback image, capable of synchronizing time on a plurality of other display control terminals. The display control terminal may be configured to include a timer section for keeping local time; a time setting section for setting time on the timer section by using time information received via a network; a display control section for playing back an image on the display device at a predetermined time, based on the local time; and a synchronization time transmitting section for simultaneously transmitting synchronization time information to the plurality of other display control terminals, based on the local time.

Furthermore, to solve the above-described problems, according to another aspect of the present invention, there is provided a multi-screen synchronized playback method of a multi-screen synchronized playback system having a plurality of display control terminals and a synchronization server connected to the plurality of display control terminals. The multi-screen synchronized playback method is characterized in including a synchronization time transmitting step of simultaneously transmitting, by the synchronization server, time information of a clock of the synchronization server to the plurality of display control devices; a time setting step of setting, by the display control terminal, time on a clock of the display control terminal based on the time information simultaneously transmitted from the synchronization server; and a display control step of starting playback of content at a playback start time set for each content, based on the time on the clock of the display control terminal.

Furthermore, to solve the above-described problems, according to another aspect of the present invention, there is provided a multi-screen synchronized playback method of a multi-screen synchronized playback system having a plurality of first display control terminals and a second display control terminal connected to the plurality of first display control terminals. The multi-screen synchronized playback method is characterized in including a display control step of starting, by the second display control terminal, playback of content at a playback start time set for each content, based on time on a clock of the second display control terminal; a synchronization time transmitting section for simultaneously transmitting, by the second display control terminal, time information of the clock of the second display control terminal to the plurality of first display control devices; a time setting step of setting, by the first display control terminal, time on a clock of the first display control terminal based on the time information simultaneously transmitted from the second display control terminal; and a display control step of starting, by the first display control terminal, playback of content at a playback start time set for each content, based on the time on the clock of the first display control terminal.

Furthermore, to solve the above-described problems, according to another aspect of the present invention, there is provided a multi-screen synchronized playback method of a multi-screen synchronized playback system having a plurality of display control terminals and a synchronization server connected to the plurality of display control terminals. The multi-screen synchronized playback method is characterized in including a playback start signal transmitting step of simultaneously transmitting, by the synchronization server, a playback start signal for each content to the plurality of display control devices at a playback start time set for each content, based on time on a clock of the synchronization server; and a display control step of starting, by the display control terminal, playback of corresponding content in accordance with the playback start signal received from the synchronization server.

Furthermore, to solve the above-described problems, according to another aspect of the present invention, there is provided a multi-screen synchronized playback method of a multi-screen synchronized playback system having a plurality of first display control terminals and a second display control terminal connected to the plurality of first display control terminals. The multi-screen synchronized playback method is characterized in including a display control step of starting, by the second display control terminal, playback of content at a playback start time set for each content, based on time on a clock of the second display control terminal; a playback start signal transmitting step of simultaneously transmitting, by the second display control terminal, a playback start signal for each content to the plurality of first display control devices at the playback start time set for each content, based on the time on the clock of the second display control terminal; and a display control step of starting, by the first display control terminal, playback of corresponding content in accordance with the playback start signal received from the second display control terminal.

Furthermore, to solve the above-described problems, according to another aspect of the present invention, there is provided a multi-screen synchronized playback method of a multi-screen synchronized playback system having a plurality of display control terminals and a synchronization server connected to the plurality of display control terminals. The multi-screen synchronized playback method is characterized in including a playback start signal transmitting step of simultaneously transmitting, by the synchronization server, time information to the plurality of display control devices at a predetermined time interval, based on time on a clock of the synchronization server; and a display control step of starting, by the display control terminal, playback of content at a playback start time set for each content, based on the time information received from the synchronization server.

Furthermore, to solve the above-described problems, according to another aspect of the present invention, there is provided a multi-screen synchronized playback method of a multi-screen synchronized playback system having a plurality of first display control terminals and a second display control terminal connected to the plurality of first display control terminals. The multi-screen synchronized playback method is characterized in including a display control step of starting, by the second display control terminal, playback of content at a playback start time set for each content, based on time on a clock of the second display control terminal; a playback start signal transmitting step of simultaneously transmitting, by the second display control terminal, time information to the plurality of first display control devices at a predetermined time interval, based on the time on the clock of the second display control terminal; and a display control step of starting, by the first display control terminal, playback of content at the playback start time set for each content, based on the time information received from the second display control terminal.

Furthermore, to solve the above-described problems, according to another aspect of the present invention, there is provided a program for causing a computer to realize any of the multi-screen synchronized playback method described above.

According to each of the configurations described above, since time information is distributed by multicast based on local time managed by a timer section of a display control terminal or a synchronization server, influence of calibration or the like by a time server on a network can be eliminated, and local time on a plurality of display control terminals can be synchronized with extremely high accuracy. Furthermore, the use of time information distributed from a general time server renders unnecessary installation of an expensive time server, for each system, capable of highly accurate time management, and enables to structure a multi-screen synchronized playback system at a low cost.

Effects of the Invention

As described above, according to the present invention, playback start time of content to be displayed on multiple screens can be accurately synchronized with each other at a low cost.

BRIEF DESCRIPTION OF THE DRAWINGS

FIG. 3 is an explanatory diagram for describing a problem in the multi-screen synchronized playback;

FIG. 13 is an explanatory diagram showing a time synchronization method according to the present embodiment.

DESCRIPTION OF REFERENCE NUMERALS

Figure 1:
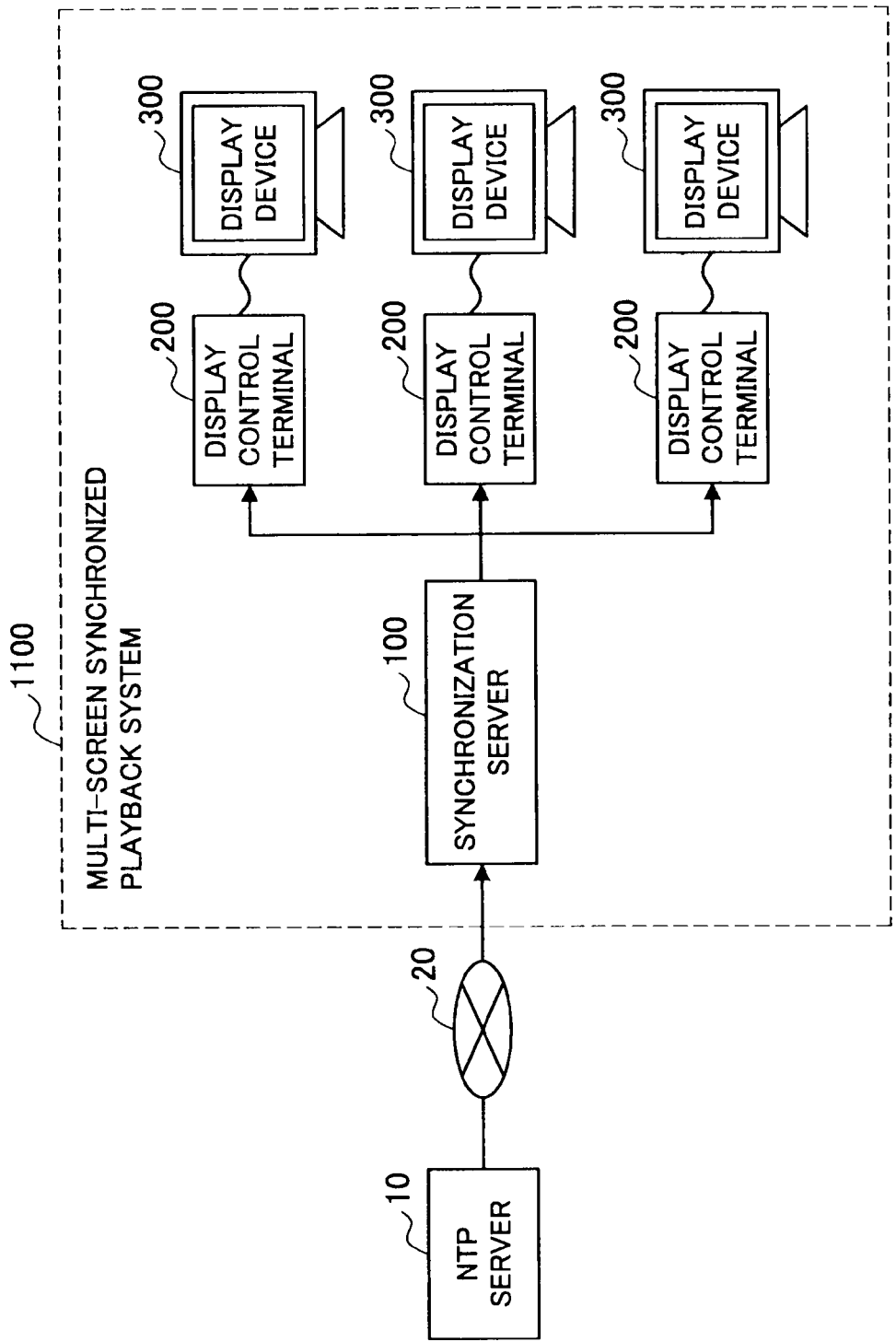
FIG. 1 is an explanatory diagram showing a configuration of a multi-screen synchronized playback system according to a first embodiment of the present invention.

10 NTP server
20 network
30 large-screen display
1100 multi-screen synchronized playback system
100 synchronization server
102 time information receiving section
104 time setting section
106 timer section
108 synchronization time transmitting section
200 display control terminal
202 time information receiving section
204 time setting section
206 timer section
208 playback image holding section
210 display control section
212 timing control section
214 image playback control section
216 playback image reading section
218 buffer memory
220 synchronization response transmitting section 252 CPU
254 memory
256 HDD
258 network interface
260 display interface
262 DSP card
264 media interface
266 recording medium
300 display device
500 synchronization server
502 playback start signal transmitting section
600 display control terminal
602 playback start signal receiving section
1200 multi-screen synchronized playback system
400 display control terminal
402 synchronization time transmitting section

BEST MODES FOR CARRYING OUT THE INVENTION

Hereafter, preferred embodiments of the present invention will be described in detail with reference to the appended drawings. Note that in this specification and the drawings, elements that have substantially the same functions and configurations are denoted with the same reference numerals and a repeated explanation is omitted.

<Time Synchronization Accuracy Required for Multi-Screen Synchronized Playback>

The meaning of error margin for time in our everyday life and the meaning of error margin for time required for multi-screen synchronized playback are clearly different. For example, if a commercial message (hereinafter referred to as a "CM") played back at 10:45:11:00 msec is displayed at 10:45:11:55 msec, we will not notice anything. However, when continuously playing back images, for example, if a CM ends at 10:45:11:00 msec and the next program starts at 10:45:11:55 msec, we will feel a sense of discomfort at the slight gap occurred at the time. Similarly, when a continuous image is displayed on two display devices adjacent to each other, for example, an image of a car reaching the right side of the left screen at 10:45:11:00 msec appears at the left side of the right screen at 10:45:11:55 msec, we will feel a sense of discomfort at the slight time lag. Furthermore, when an image displayed on two screens shows a scene that is to change simultaneously, for example, if the image on the left screen changes at 10:45:11:00 msec and the image on the right screen changes at 10:45:11:55 msec, we will feel a sense of discomfort at the slight difference.

A general server is a server managing the time in our everyday life. For example, management is conducted so that an error is not occurred due to a time difference between a plurality of devices communicating with each other. A high accuracy is, of course, achieved when compared to a general clock running on a battery or the like and a clock realized as software in a general-purpose PC or the like, and from a viewpoint of conformity to the standard time (Coordinated Universal Time), an extremely accurate time is provided. However, the accuracy of time synchronization provided by the time server and the accuracy of synchronization time required for a multi-screen synchronized playback are clearly different. Thus, the present invention provides a technology for managing the time on a synchronization server (or the function thereof) included in a multi-screen synchronized playback system by using a general time server on a network, along with managing the time on a display control terminal with high accuracy by using the local time on the synchronization server. With this configuration, a multi-screen synchronized playback system with high accuracy can be realized at a low cost.

<Organization of Problems and Overview of Present Invention>

(Organization of Problems)

As described above, although time on a plurality of display control devices can be synchronized with a certain level of accuracy by using a general-purpose time synchronization technology such as the NTP client, it is difficult to realize highly accurate time synchronization required for multi-screen synchronized playback of high-quality content. An object of the present invention is to provide means to solve the problem. Furthermore, when using a general-purpose device such as a PC as the display control device, degradation of image quality and limitation on the number of display screens due to the display load of high-quality content or computational load required for decoding should be taken into consideration.

For example, when continuously playing back a plurality of contents, since the time required for a process of switching content is different for each display control terminal, a difference occurs between playback start times of the content to be subsequently played back. Furthermore, since computational processing capability or the like for performing playback processing of content differs for each display control terminal, playing time length of the content is varied. As a result, a difference occurs between the playback start times of the content to be subsequently played back among the display control terminals.

(Tangible Result of Measuring Error)

Here, a result of carrying out an accuracy measurement by a concrete configuration of synchronizing time by using the NTP client will be shown. As an example, the accuracy measurement is carried out by using w32time included in standard in MS-Windows (registered trademark). Time was set by installing one NTP client/server and one NTP client in a local area network (LAN). At this time, error between the time on the NTP client/server and the time on the NTP client is measured by using a command provided by w32time (stripchart). As a result, occurrence of errors of approximately 55 msec on the average and approximately 100 msec at the maximum are confirmed. Furthermore, it is also confirmed that amplitude of the error is unstable depending on each measurement time. Accordingly, it is confirmed that solving the above-described problems with a simple configuration of distributing time information in consideration of the error is difficult.

(Overview of Present Invention)

In view of the above-described problems, an object of the present invention is to provide a multi-screen synchronized playback system a characteristic of which lies in a configuration of installing a synchronization server having both a function equivalent to that of the NTP client and a function equivalent to that of a time server (or a display control terminal having the functions) on a network (for example, on the LAN), and distributing time information by multicast to a plurality of display control terminals connected via the network. When applying the configuration, the difference between the time on the synchronization server and the time on each display control terminal can be reduced to approximately 10 msec on the average.

Furthermore, in view of a problem of a difference occurring in the playback start time at the time of the process of switching content, another object of the present invention is to provide a multi-screen synchronized playback system a characteristic of which lies in a configuration of prefetching and buffering, by each display control terminal, content to be subsequently played back. When applying the configuration, a delay in playback time which occurs at the time of switching content can be suppressed.

Furthermore, in view of a problem of the playing time lengths of the content being varied for respective display control terminal devices, a further another object of the present invention is to provide a multi-screen synchronization system a characteristic of which lies in a configuration of starting playback of next content according to time on a clock of each display control terminal without waiting for the end of playback of content being played back before the next content. When applying the configuration, even if the playing time length of content differs for each display control terminal, start time of content to be subsequently played back can be synchronized and a delay in the playback time can be avoided.

By the application of the above-described technologies according to the present invention, time synchronization with high accuracy can be realized by using a general-purpose time synchronization technology, and also, even if a processing capability for a process of playing back content is different for each display control terminal, content can be synchronized with high accuracy and content to be played back can be displayed on multiple screens. Furthermore, since the configuration is enabled by combining hardware of a general-purpose information processing apparatus and a general-purpose time synchronization technology such as the NTP, it is possible to provide a particularly cheap multi-screen synchronized playback system compared to a conventional multi-screen synchronized playback system configured by using expensive materials such as a splitter for digital video signals. As a result, the number of the display screens can be easily increased/decreased, and a system adapted to image quality required, size of the display screen, or the like, can be easily configured.

In the following, preferred embodiments of the present invention capable of realizing each function and effect described above will be described in detail.

First Embodiment

First, a multi-screen synchronized playback system 1100 according to a first embodiment of the present invention will be described in detail.

<Configuration of Multi-Screen Synchronized Playback System 1100>

First, referring to FIG. 1, a configuration of the multi-screen synchronized playback system 1100 according to the present embodiment will be described. FIG. 1 is an explanatory diagram showing the configuration of the multi-screen synchronized playback system 1100 according to the present embodiment.

Referring to FIG. 1, the multi-screen synchronized playback system 1100 is mainly configured from a synchronization server 100, a plurality of display control terminals 200, and a plurality of display devices 300. Furthermore, the synchronization server 100 is connected to an NTP server 10 via a network 20. Moreover, although a configuration is shown in FIG. 1 where one display device 300 is connected to one display control terminal 200, the multi-screen synchronized playback system 1100 according to the present embodiment is not limited to thereto. As described later, a configuration is also possible where a plurality of display devices 300 are connected to one display control terminal 200. That is, it should be noted that the display device 300 shown in FIG. 1 is representing a display device 300 connected to the display control terminal 200.

(NTP Server 10)

The NTP server 10 is a server device connected to the network 20 and capable of transmitting time information based on an NTP protocol. The NTP server 10 synchronizes time on each device by transmitting time information as standard to each device connected to the network 20 so as to prevent errors occurring at the time of data exchange (for example, transmission/reception of emails and files, log distribution, or the like), dependent on time, between devices due to the time on each device connected to the network 20 being different between the devices. Furthermore, the NTP server 10 has a function of compensating for time error occurred between each device due to a communication delay, by taking into account the communication delay due to, for example, traffic at the time of communication or transmission distance.

Here, for the sake of convenience of explanation, explanation will be made with the NTP server 10 using the NTP protocol as an example. However, instead of the NTP server 10, connection can be made to a time server capable of distributing time information as standard or the time server can be installed. For example, a classical time synchronization method such as Time Protocol not taking into account the above-described communication delay can also be applied. The NTP server 10 is a time server distributing Coordinated Universal Time (UTC), or a time server distributing time information based on an internal clock synchronized with Coordinated Universal Time, for example.

(Network 20)

The network 20 is a communication network for connecting at least the NTP server 10 and the synchronization server 100 so as to be able to carry out bidirectional communication or single-direction communication. The network 20 is configured from, for example, public network such as the Internet, telephone network, satellite network or broadcast channels, or leased line network such as wide area network (WAN), local area network (LAN), Internet protocol-virtual private network (IP-VPN) or a wireless LAN, and it may be wired or wireless.

(Synchronization Server 100)

The synchronization server 100 receives the time information transmitted by the NTP server 10 via the network 20, and synchronizes the time on its own clock with the time on the NTP server 10. At this time, the synchronization server 100 can also acquire the time information from another time server connected to the network 20. That is, the synchronization server 100 may be configured to be able to use a protocol other than the NTP to acquire the time information to be used for the time synchronization of itself.

Furthermore, the synchronization server 100 transmits the time information to the plurality of display control terminals 200 all at once so as to synchronize the time on the plurality of display control terminals 200 included in the multi-screen synchronized playback system 1100 with each other. At this time, the synchronization server 100 controls the timing of transmitting the time information based on the time on its own clock. Moreover, a detailed functional configuration of the synchronization server 100 will be described later.

(Display Control Terminal 200)

The display control terminal 200 is connected to one or a plurality of display devices 300, and has a function of playing back and displaying content on the display device 300. At this time, the display control terminal 200 plays back the content at a time set for each content according to the time on its own clock. Accordingly, the display control terminal 200 receives the time information from the synchronization server 100 on a regular or irregular basis, and synchronizes the time on its own clock with the time on the synchronization server 100 as well as with the other display control terminals 200 included in the multi-screen synchronized playback system 1100. Moreover, the detailed functional configuration and hardware configuration of the display control terminal 200 will be described later.

(Display Device 300)

The display device 300 is connected to the display control terminal 200, and displays an image of content to be played back by the display control terminal 200. The display device 300 is configured from, for example, a liquid crystal display (LCD), a plasma display panel (PDP), a cathode ray tube (CRT), a video projector, or a light emitting diode display. The configuration of the display device 300 is, of course, not limited thereto, and various display devices are applied according to the level of a general or a leading display technology of the period.

Heretofore, the configuration of the multi-screen synchronized playback system 1100 according to the present embodiment has been described. With the configuration described above, high-quality content is synchronously played back with high accuracy by the plurality of display control terminals 200, and is displayed on the plurality of display devices 300.

Concrete Example of Multi-Screen Synchronized Playback

First, referring to FIGS. 2 and 3, a concrete scene or the like for a multi-screen synchronized playback requiring a highly accurate synchronized playback will be briefly described.

Concrete Example 1

First, referring to FIG. 2, processing for a moving image to be continuously played back over the plurality of display devices 300 will be described as a concrete example of the multi-screen synchronized playback. FIG. 2 is an explanatory diagram for describing a concrete example of a multi-screen synchronized playback according to the present embodiment.

As shown in FIG. 2, the multi-screen synchronized playback system 1100 according to the present embodiment can divide and playback content which is originally meant to be continuously played back on a large-screen display 30 on the plurality of display devices 300. At this time, assuming that the resolution of the display device 300 is 1360×768 dpi, content playback equivalent to that by the large-screen display 30 with a resolution of 4080×768 is enabled. Here, for the sake of convenience of explanation, a configuration is shown as an example where content is divided and displayed on three display devices 300. However, content can also be divided and displayed on two display devices 300 or four or more display devices 300.

Figures 2A, 2B, 2C, 2D:
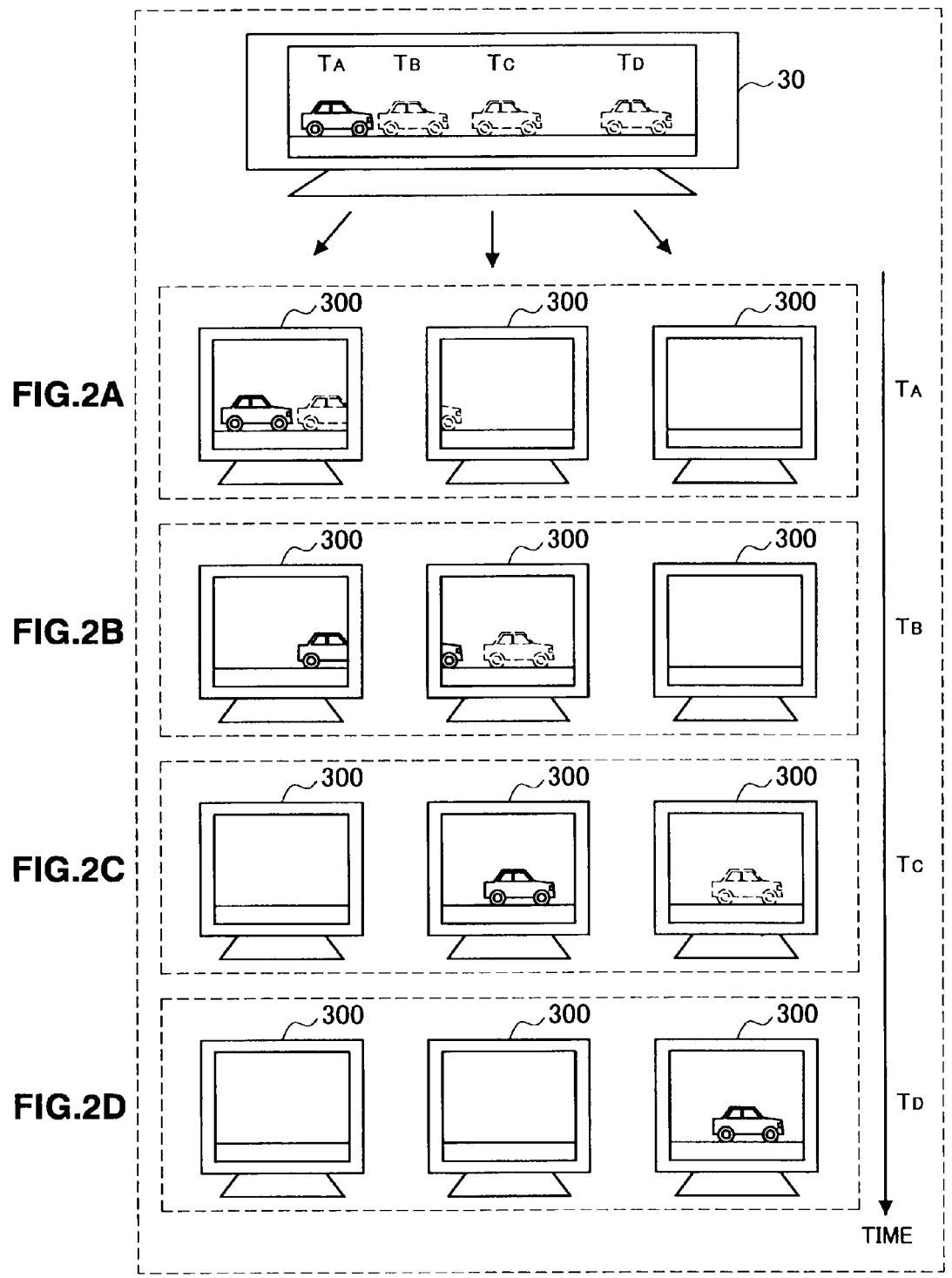
FIG. 2 is an explanatory diagram for describing a problem in multi-screen synchronized playback.

FIG. 2 shows the large-screen display 30 as well as three display devices 300 each connected to the display control terminal 200. FIG. 2(A) shows three display devices 300 on which content being played back at time TA is displayed. FIG. 2(B) shows three display devices 300 on which content being played back at time TB is displayed. FIG. 2(C) shows three display devices 300 on which content being played back at time TC is displayed. FIG. 2(D) shows three display devices 300 on which content being played back at time TD is displayed. Furthermore, the state of content being played back between time TA to time TB is shown on the large-screen display 30.

First, referring to the display screen of the large-screen display 30, content shown as the example here will be described. As shown on the display screen of the large-screen display 30, a moving image of a car located on the left side of the screen at time TA reaching near the right side of the screen at time TD is shown as the example of content to be used for the explanation. Locations at in-between times TB and TC are also shown.

When the moving image content as described above is divided and displayed on three display devices 300, it will be as shown in FIGS. 2(A) to 2(D). The accuracy of time synchronization may become an issue in the multi-screen synchronized playback system 1100 described above at a time point shown in FIG. 2(B). That is, at the time point when a part of the car that reached the right side of the display device 300 located on the left appears from the left side of the display device 300 located in the middle. At this time, when the accuracy of the time synchronization is poor, a circumstance arises where the car does not appear on the display device 300 located in the middle even though the car has reached the right side of the display device 300 located on the left and a part of the car went out of the screen. On the contrary, a circumstance arises where the car appears on the display device 300 located in the middle even though the car has not reached the right side of the display device 300 located on the left.

The circumstances as described above arises since the display control terminal 200 controls the timing of the start of playback for a part of the content to be displayed by the display device 300 connected to itself. That is, the display control terminal 200 connected to the display device 300 located in the middle extracts and displays content corresponding to the central portion of the content, for example, and thus the problem as described above arises if the playback start time of the portion is early or late. However, with the multi-screen synchronized playback system 1100 according to the present embodiment, since the time synchronization is performed between the plurality of display control terminals 200 with high accuracy, the above-described problem can be mitigated to an acceptable level.

Particularly, the configuration of the present embodiment is effective when the number of the display devices 300 on which content is to be divided and displayed is large. This is because, when synchronized playback is to be performed on a small number of display devices 300, such as three, a highly accurate synchronized playback can be easily realized by installing three graphics cards (hereinafter, sometimes referred to as a display card or a DSP card) on one display control terminal 200 and connecting the display device 300 to each DSP card. However, as the number of the display devices 300 increases, the processing load required by the display control terminal 200 for playback processing of content increases, giving rise to a circumstance where image quality is degraded or an image frame is dropped, and thus it should be noted that there is a limitation on the number of the display devices 300 that can be connected.

Concrete Example 2

Next, referring to FIG. 3, a process of synchronously playing back a whole image on the plurality of display devices 300 will be described as a concrete example of the multi-screen synchronized playback. FIG. 3 is an explanatory diagram for describing a concrete example of the multi-screen synchronized playback according to the present embodiment.

As with FIG. 2, FIG. 3 shows the large-screen display 30 as well as three display devices 300 each connected to the display control terminal 200. FIG. 3(A) shows three display devices 300 on which content being played back at time TA is displayed. FIG. 3(B) shows three display devices 300 on which content being played back at time TB is displayed. FIG. 3(C) shows three display devices 300 on which content being played back at time TC is displayed.

First, referring to the display screen of the large-screen display 30, content shown as the example here will be described. An image is shown on the display screen of the large-screen display 30 where two light bulbs are serially connected to a power source and a switch is provided on the connection path. Although only an image where the switch is open is shown on the display screen of the large-screen display 30, it is assumed that the content is content of an image where the switch is open at time TA, closed at time TB and open at time TC.

When the moving image content as described above is divided and displayed on three display devices 300, it will be as shown in FIGS. 3(A) to 3(C). The accuracy of time synchronization may become an issue in the multi-screen synchronized playback system 1100 described above at a time point shown in FIG. 3(B). That is, at the instant of the two light bulbs simultaneously lighting up just as the switch is closed. At this time, when the accuracy of the time synchronization is poor, a circumstance arises where, at the same time as the switch displayed on the display device 300 located in the middle closes, the light bulb displayed on the same display screen lights up, but the light bulb displayed on the display device 300 located on the left is not lit up. On the contrary, a circumstance arises where, at the same time as the switch displayed on the display device 300 located in the middle opens, the light bulb displayed on the same display screen goes out, but the light bulb displayed on the display device 300 located on the left is still lit up.

In the example of FIG. 3, a case is pointed out where images, which are originally supposed to be a whole image, are played back inconsistently with each other. For example, at a shopping mall or the like, in a case of using, for example, an advertising technique (so-called Jack) of displaying the same image on a plurality of display screens at the same time, as a result of the same image being displayed in a disorganized manner, the viewers feel a sense of discomfort, and also sponsors, who aimed for a sensational commercial effect by a sudden simultaneous display, suffer from a loss of the effect of commercials. However, with the multi-screen synchronized playback system 1100 according to the present embodiment, since the time synchronization between the plurality of display control terminals 200 is performed with high accuracy, the above-described problem can be mitigated to an acceptable level.

Heretofore, concrete examples of the multi-screen synchronized playback requiring highly accurate time synchronization have been described. In the following, the configuration of the multi-screen synchronized playback system 1100 capable of solving the above-described problems will be described in detail.

<Configuration of Synchronization Server 100>

Figure 4:
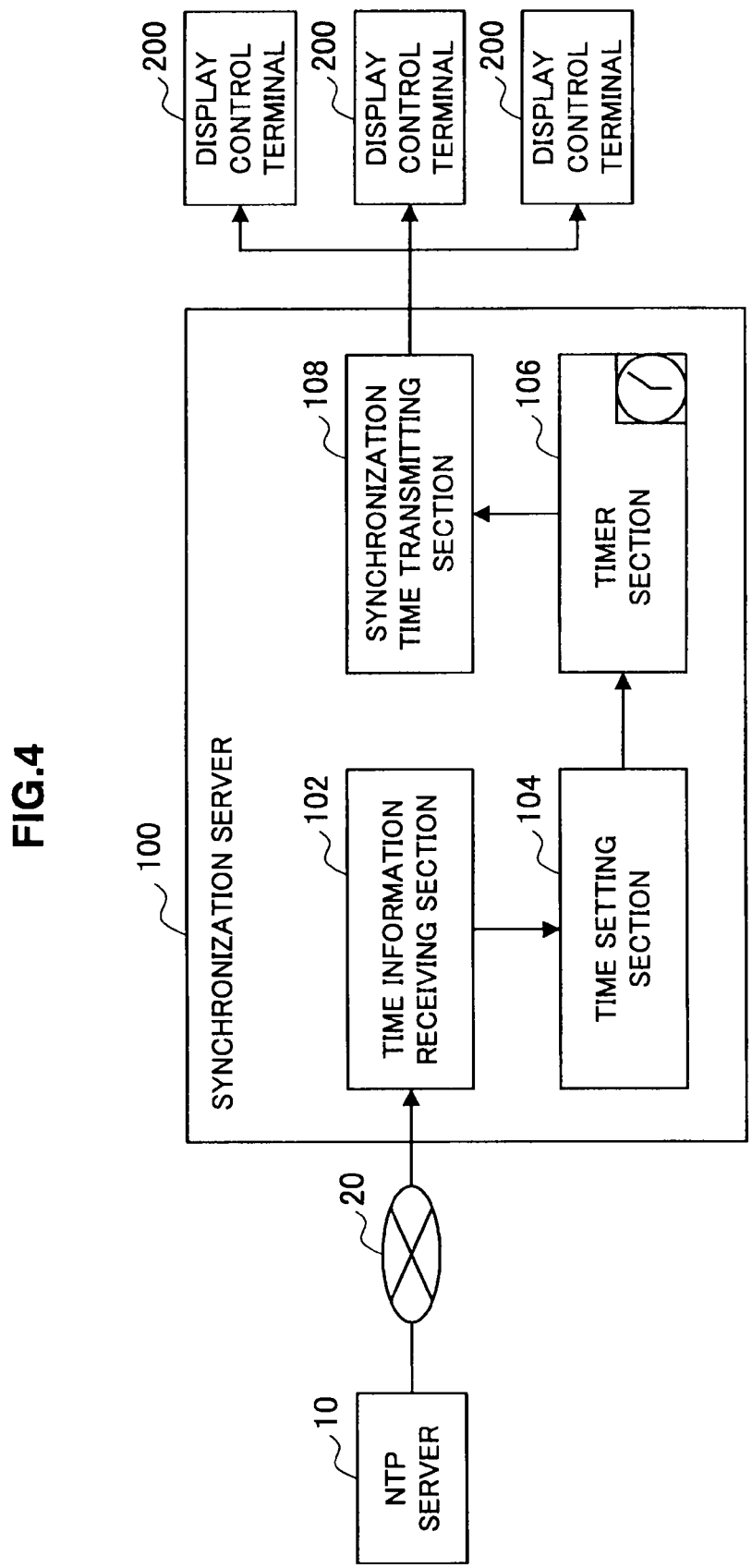
FIG. 4 is an explanatory diagram showing a functional configuration of a synchronization server according to the present embodiment.

Next, referring to FIG. 4, a functional configuration of the synchronization server 100 according to the present embodiment will be described. FIG. 4 is an explanatory diagram showing the functional configuration of the synchronization server 100 according to the present embodiment.

As shown in FIG. 4, the synchronization server 100 is mainly configured from a time information receiving section 102, a time setting section 104, a timer section 106, and a synchronization time transmitting section 108. Furthermore, the time information receiving section 102 is connected to the NTP server 10 via the network 20. Also, the synchronization time transmitting section 108 is connected to the plurality of display control terminals 200.

(Time Information Receiving Section 102)

The time information receiving section 102 receives time information from the NTP server 10 connected via the network 20. At this time, the time information receiving section 102 can also transmit a time information request signal requesting the NTP server 10 for the time information. Furthermore, the time information receiving section 102 may be configured to transmit information relating to the difference between the time on the synchronization server 100 and the time on the NTP server 10 to the NTP server 10. Furthermore, the time information receiving section 102 may be configured to receive the time information from a time server using another protocol connected to the network 20.

(Time Setting Section 104, Timer Section 106)

The time setting section 104 acquires the time information from the time information receiving section 102, and sets time on the timer section 106 described later based on the time information. That is, the time setting section 104 sets the current time on the timer section 106 to the time indicated by the time information received by the time information receiving section 102. The timer section 106 is a clock of the synchronization server 100. The timer section 106 has a function of keeping time with the time set by the time setting section 104 as the standard. The timer section 106 is configured from a system clock or the like of the synchronization server 100, for example.

(Synchronization Time Transmitting Section 108)

The synchronization time transmitting section 108 generates time information based on the time kept by the timer section 106, and transmits the time information to the plurality of display control terminals 200 all at once. That is, the synchronization time transmitting section 108 multicasts, based on the timer section 106, time information indicating a predetermined time to the plurality of display control terminals 200 in the multi-screen synchronized playback system 1100. Furthermore, the synchronization time transmitting section 108 can also be configured to broadcast the above-described time information. At this time, the synchronization time transmitting section 108 can transmit the time information without performing compensation by taking into account the influence of a transmission delay between itself and the plurality of display control terminals 200, communication traffic, or the like.

That is, unlike the NTP server 10, the synchronization time transmitting section 108 can simultaneously transmit the time information to the plurality of display control terminals 200 without taking into account the influence of a transmission delay due to the state of the transmission path, or the like. Moreover, the synchronization time transmitting section 108 can be configured to transmit the time information to only a part of the plurality of display control terminals 200. The synchronization time transmitting section 108 can transmit the time information to the plurality of display control terminals 200 on a regular basis, or can also transmit the time information on an irregular basis.

Heretofore, the functional configuration of the synchronization server 100 according to the present embodiment has been described. According to the above-described configuration, the time on the timer section 106 of itself can be synchronized with Coordinated Universal Time based on the time information received from the NTP server 10, and at the same time, with regard to the plurality of display control terminals 200 located within the multi-screen synchronized playback system 1100, time can be synchronized between the display control terminals 200, where all the errors derived from a general-purpose time synchronization technology such as the NTP are eliminated, by multicasting the time information based on the time on the timer section 106. Moreover, when time is set by multicasting, the error can be suppressed to approximately 10 msec on the average. Moreover, each function of the synchronization server 100 is realized by a hardware configuration substantially the same as that of a general-purpose information processing apparatus. For example, it is realized by hardware such as a central processing unit or the like based on a program stored in a storage section, or the like, for example.

<Hardware Configuration of Display Control Terminal 200>

Figure 5:
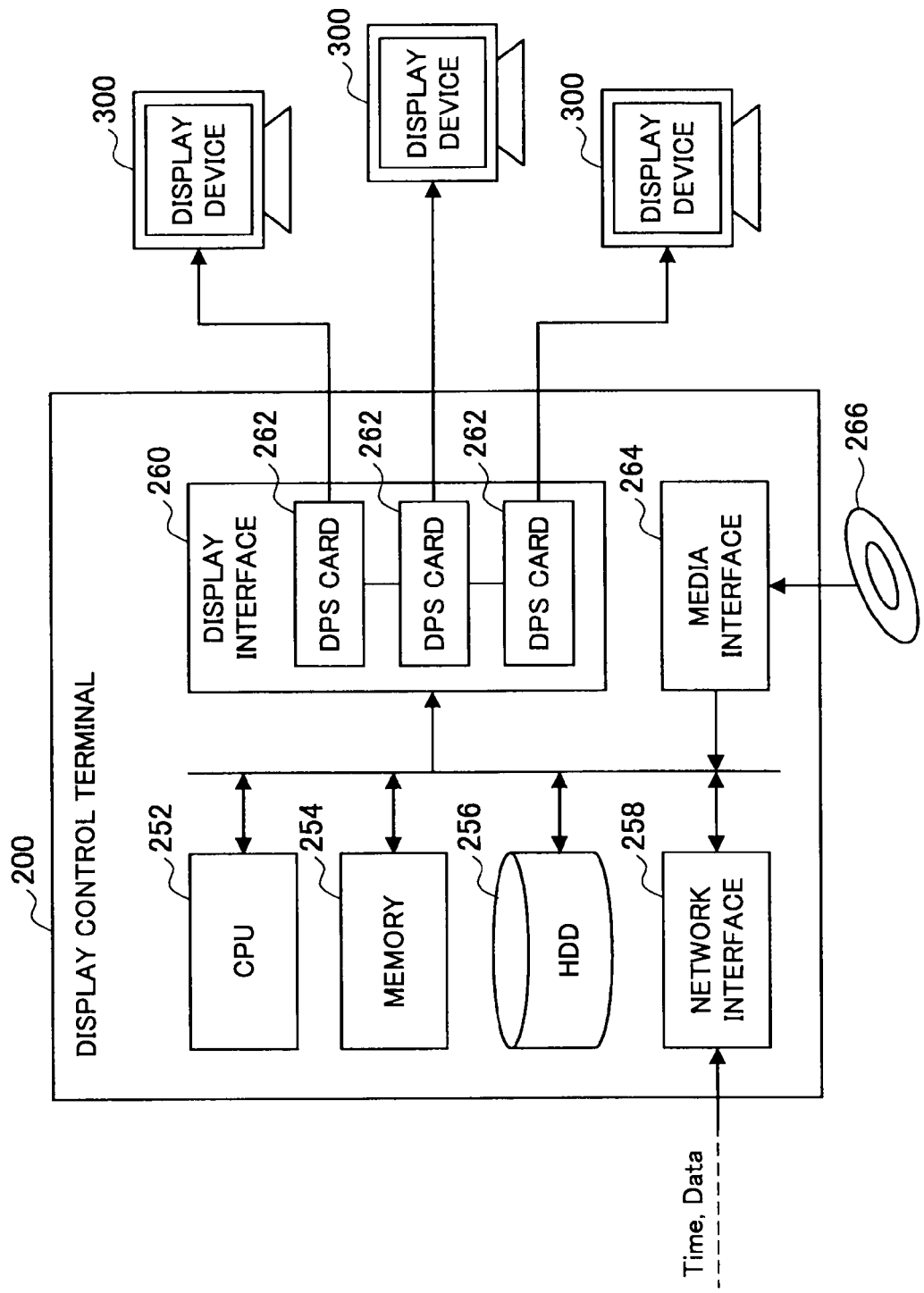
FIG. 5 is an explanatory diagram showing a hardware configuration of a display control device according to the present embodiment.

Next, referring to FIG. 5, a hardware configuration of the display control terminal 200 according to the present embodiment will be briefly described. FIG. 5 is an explanatory diagram showing the hardware configuration of the display control terminal 200 according to the present embodiment.

The display control terminal 200 is mainly configured from a CPU 252, a memory 254, a HDD 256, a network interface 258, a display interface 260, and a media interface 264. Furthermore, one or a plurality of DSP cards 262 are connected to the display interface 260, each of which being connected to the display device 300. The media interface 264 is configured in a way that allows a recording medium 266 to be inserted therein or connected thereto.

The CPU 252 is a general-purpose central processing unit, for example. The memory 254 is a semiconductor memory called a read only memory (ROM), a random access memory (RAM), or the like. The HDD 256 is a magnetic recording medium such as a hard disk drive. The DSP card 262 is a so-called graphics card. The recording medium 266 is, for example, a CD-ROM, a CD-R/RW, a DVD-ROM, a DVD-R/–RW/+R/+RW, a DVD-RAM, a BD-ROM, a BD-R/RE, a memory stick (registered trademark), a compact flash (registered trademark), an SD card, a USB memory, or the like.

For example, data of content to be played back is stored in the HDD 256 or the recording medium 266, and image data decoded by the CPU 252 is sent to the DSP card 262 via the display interface 260 and is displayed on the display device 300 via the DSP card 262. Furthermore, data of content can be also received via the network interface 258.

Heretofore, the hardware configuration of the display control terminal 200 has been briefly described. Each function of the display control terminal 200 described below can be realized by using the above-described hardware resources, and those skilled in the art can readily correlate the above-described hardware configuration and the functional configuration of the display control terminal 200 described below. Furthermore, the above-described hardware configuration is only an example, and a dedicated hardware for realizing a part or all of the functions of the display control terminal 200 described below can also be provided.

<Configuration of Display Control Terminal 200>

Figure 6:
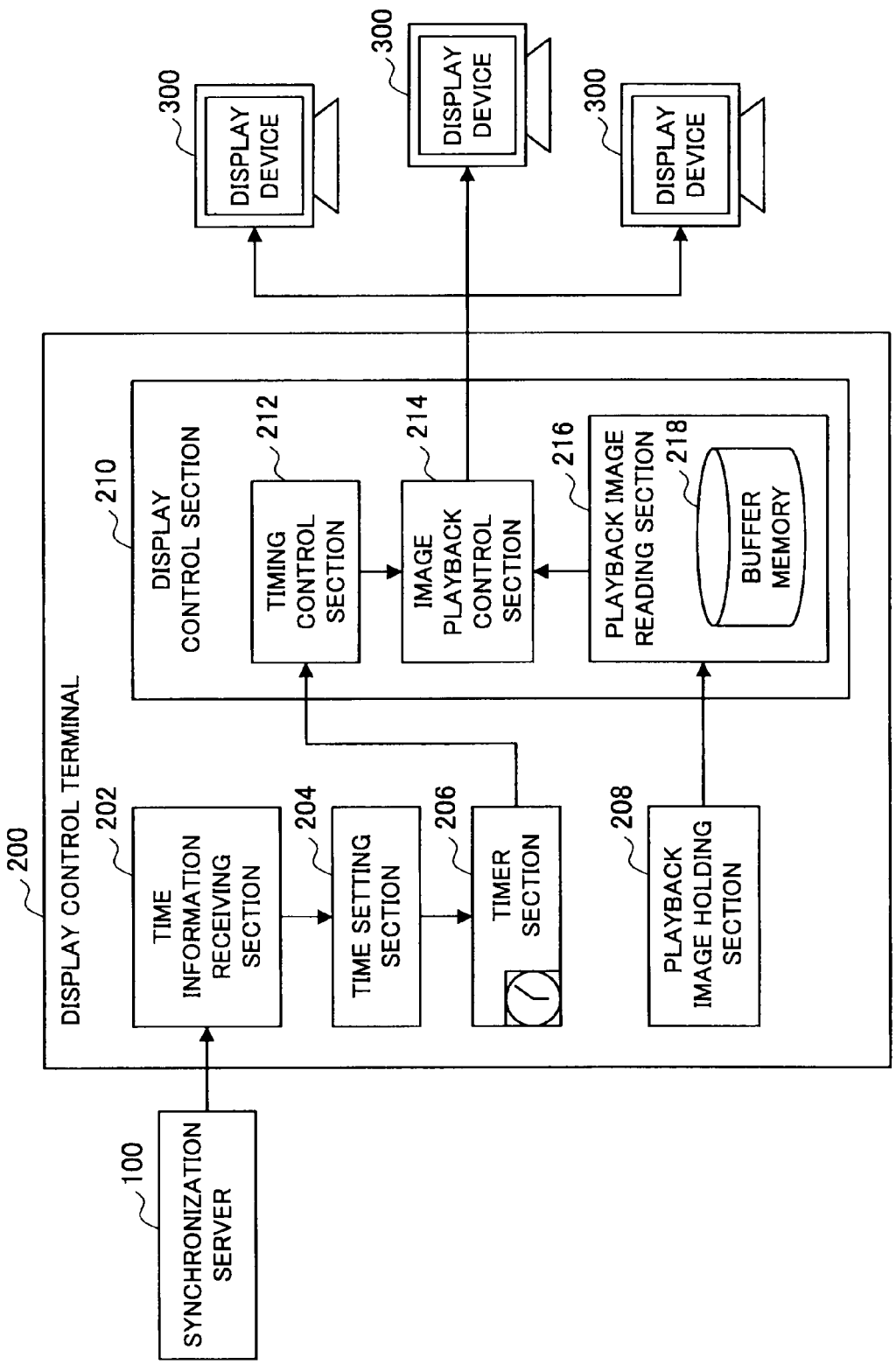
FIG. 6 is an explanatory diagram showing a functional configuration of the display control device according to the present embodiment.

Next, referring to FIG. 6, a configuration of the display control terminal 200 according to the present embodiment will be described. FIG. 6 is an explanatory diagram showing a functional configuration of the display control terminal 200 according to the present embodiment.

As shown in FIG. 6, the display control terminal 200 is mainly configured from a time information receiving section 202, a time setting section 204, a timer section 206, a playback image holding section 208, and a display control section 210. Furthermore, the display control section 210 is mainly configured from a timing control section 212, an image playback control section 214, and a playback image reading section 216. The playback image reading section 216 includes a buffer memory 218.

(Time Information Receiving Section 202)

The time information receiving section 202 receives time information from the synchronization server 100. At this time, the time information receiving section 202 can also transmit a time information request signal requesting the synchronization server 100 for the time information. Furthermore, the time information receiving section 202 can be configured to transmit to the synchronization server 100 information relating to the difference between the time on the synchronization server 100 and the time on the display control terminal 200.

(Time Setting Section 204, Timer Section 206)

The time setting section 204 acquires the time information from the time information receiving section 202, and sets time on the timer section 206 described later based on the time information. That is, the time setting section 204 sets the current time on the timer section 206 to the time indicated by the time information received by the time information receiving section 202. The timer section 206 is a clock of the display control terminal 200. The timer section 206 has a function of keeping time with the time set by the time setting section 204 as the standard. The timer section 206 is configured from a system clock or the like of the display control terminal 200, for example.

(Playback Image Holding Section 208)

The playback image holding section 208 holds data of content to be played back. For example, the playback image holding section 208 is configured from the HDD 256 or the recording medium 266 described above. The playback image holding section 208 may hold content read out from the above-described recording medium 266, or may hold content received via the above-described network interface 258.

(Display Control Section 210; Timing Control Section 212)

The timing control section 212 configuring the display control section 210 notifies a playback start time set for each content to the image playback control section 214 based on the time kept by the timer section 206. At this time, when continuously playing back a plurality of contents, in a case the playback of previous content has not ended even though the playback start time for the next content has passed, the timing control section 212 can change the playback start time of the next content and notify the image playback control section 214 of the same so that the playback of the next content is started after the playback of the previous content has ended. However, even during the playback of the previous content, the timing control section 212 notifies the image playback control section 214 of the playback start time of the next content so that the playback of the previous content is interrupted and the playback of the next content is started.

The configuration of the timing control section 212 described above serves as a solving means for the problem that the playing time length of the same content is varied for the respective display control terminals 200. A plurality of display control terminals 200 are included in the multi-screen synchronized playback system 1100, and when the computational processing capability of the display control terminals 200 is not uniform, a problem arises that there is a difference between the playing time lengths of the content for the respective display control terminals 200. Particularly, when continuously playing back a plurality of contents, the difference between the playing time lengths arising for each content accumulates, and images to be played back will be temporally shifted from each other to a large degree for the content to be played back afterward. Furthermore, also in playback end processing for the content, there occurs a difference in processing time lengths due to the difference in the processing capability of the display control terminals 200, and thus the difference will be larger for a larger image to be played back. However, the configuration of the timing control section 212 described above enables to avoid these problems.

That is, when the playback start time set for each content to be played back by each display control terminal 200 is reached, the timing control section 212 forcibly ends the previous content without waiting for the end of its playback and starts playback of the next content. As a result, since the playback start time of the next content is maintained even if the playback time of the previous content is delayed, accumulation of the delays can be eliminated. Moreover, although a part of the last portion of the previous content will be omitted, the omission will be limited to approximately several frames for content of approximately several seconds, and thus practically no problem is caused.

(Display Control Section 210; Playback Image Reading Section 216)

The playback image reading section 216 configuring the display control section 210 reads data of content held in the playback image holding section 208, and transfers the same to the image playback control section 214. At this time, when continuously playing back a plurality of contents, the playback image reading section 216 can transfer data of the previous content to the image playback control section 214, and at the same, can read out data of the next content from the playback image holding section 208 and buffer the same in the buffer memory 218, for example. That is, the playback image reading section 216 can read out data of content from the playback image holding section 208 in the background before the playback start time of the next content is reached. Moreover, the buffer memory 218 is configured from a storage device capable of reading out at a higher speed than the playback image holding section 208, and is realized by the memory 254 described above, for example.

The configuration of the playback image reading section 216 described above serves as a solving means for a problem that, when continuously playing back a plurality of contents, a screen goes blank while a read processing is being performed for the next content at the time of switching from the previous content to the next content. More specifically, when playing back content in WMV format or the like, a circumstance arises where a black screen is displayed for a moment at the time of buffering processing of reading the next content, and contents are not switched smoothly. Furthermore, when a plurality of display control terminals 200 included in the multi-screen synchronized playback system 1100 reads the same content, there is a problem that, since time required for the read processing differ from each other, the playback start time of content to be played back next is varied. However, the configuration of the playback image reading section 216 described above enables to avoid the problem.

That is, since the playback image reading section 216 performs the read processing of the content to be played back next in the background before the playback start time, the temporary playback of a black screen occurring at the time of content switching can be suppressed. In other words, the playback image reading section 216 will be performing double buffering. As a result, a smooth content switching can be realized.

(Display Control Section 210; Image Playback Control Section 214)

The image playback control section 214 can playback data of content transferred from the playback image reading section 216 according to a timing notified by the timing control section 212. The image playback control section 214 is connected to one or a plurality of display devices 300, and can display an image by converting data of content into an image signal and transferring the same to the display device 300. Moreover, although a configuration where three display devices 300 are connected to the image playback control section 214 is shown in FIG. 6, this is for a correspondence with the configuration in FIG. 5. Accordingly, it should be noted that one display device 300 shown in FIG. 1 corresponds with the three display devices 300 shown in FIG. 6. Of course, it is needless to say that the number of the display devices 300 to be connected to the image playback control section 214 is not limited thereto.

Heretofore, the functional configuration of the display control terminal 200 according to the present embodiment has been described. By the application of the above-described configuration, a problem that the playing time length of content is varied due to the difference in the processing capability of each display control terminal 200, a problem that the playback start time of content is varied due to the difference in the read time at the time of content switching, or the like, arising at the time of continuously playing back a plurality of contents can be avoided. Although these effects are extremely important when continuously playing back contents, the characteristic of the present embodiment lies in a configuration allowing playback of content based on the time on a clock (timer sections 206) which is synchronized with high accuracy. The solving means for the problems described above become effective when the configuration is included. Thus, a method of synchronizing time between the synchronization server 100 and the display control terminal 200 will be described in the following.

<Time Synchronization Method>

Figure 7:
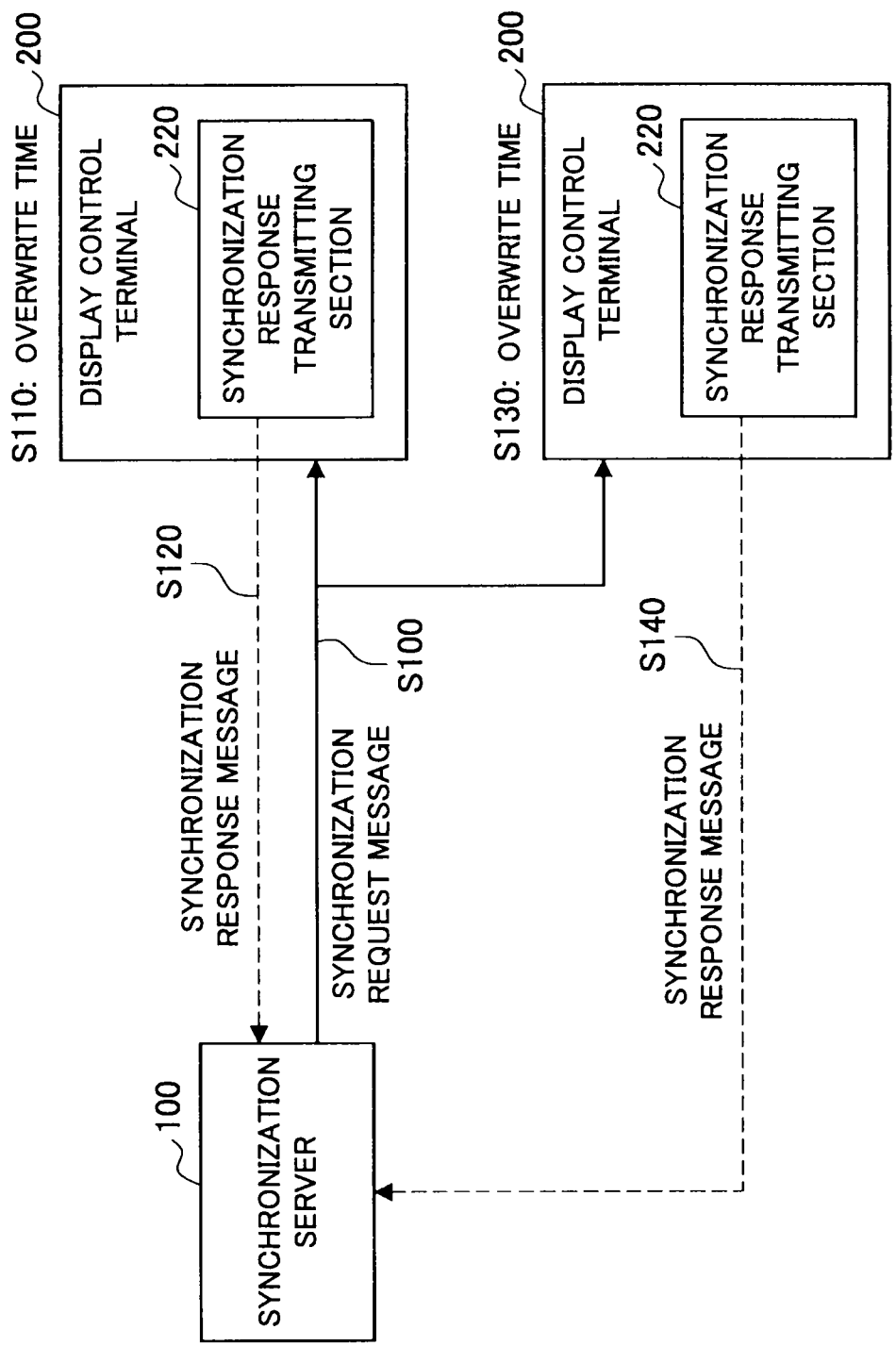
FIG. 7 is an explanatory diagram for showing a time synchronization method according to the present embodiment.

Next, referring to FIG. 7, a time synchronization method according to the present embodiment will be described. FIG. 7 is an explanatory diagram for describing the method of synchronizing time between the synchronization server 100 and the display control terminal 200 according to the present embodiment.

As shown in FIG. 7, according to the time synchronization method according to the present embodiment, the synchronization server 100 regularly transmits by multicast a synchronization request message to a plurality of display control terminals 200 (S100). At this time, the synchronization server 100 can also be configured to regularly transmit the synchronization request message by broadcast. As shown in FIG. 13(B), a message identifier+checksum, a server port, and a server time (standard time; time information) are included in the synchronization request message, for example.

Subsequently, each display control terminal 200 sets time on the timer section 206 based on the server time included in a synchronization response message received from the synchronization server 100 (S110, S130). Subsequently, each display control terminal 200 transmits by unicast the synchronization response message to the synchronization server 100 (S120, S140). As shown in FIG. 13(C), a message identifier+checksum, a server time, a client time (before overwrite), and a client time (after overwrite) are included in the synchronization response message, for example. As shown in FIG. 7, the display control terminal 200 can be configured to further include a synchronization response transmitting section 220 for transmitting the synchronization response message.

Heretofore, a time synchronization process according to the present embodiment has been described. By the above-described process, the times on a plurality of display control terminals 200 are synchronized, and also the synchronization server 100 can detect, by receiving the synchronization response message, the difference between the times on the plurality of display control terminals 200 and the difference between its own time and the time on each display control terminal 200. Furthermore, the synchronization server 100 can also adjust time interval between the synchronization request messages regularly transmitted, based on the magnitude of difference detected.

<Prefetch Processing Method>

Figure 8:
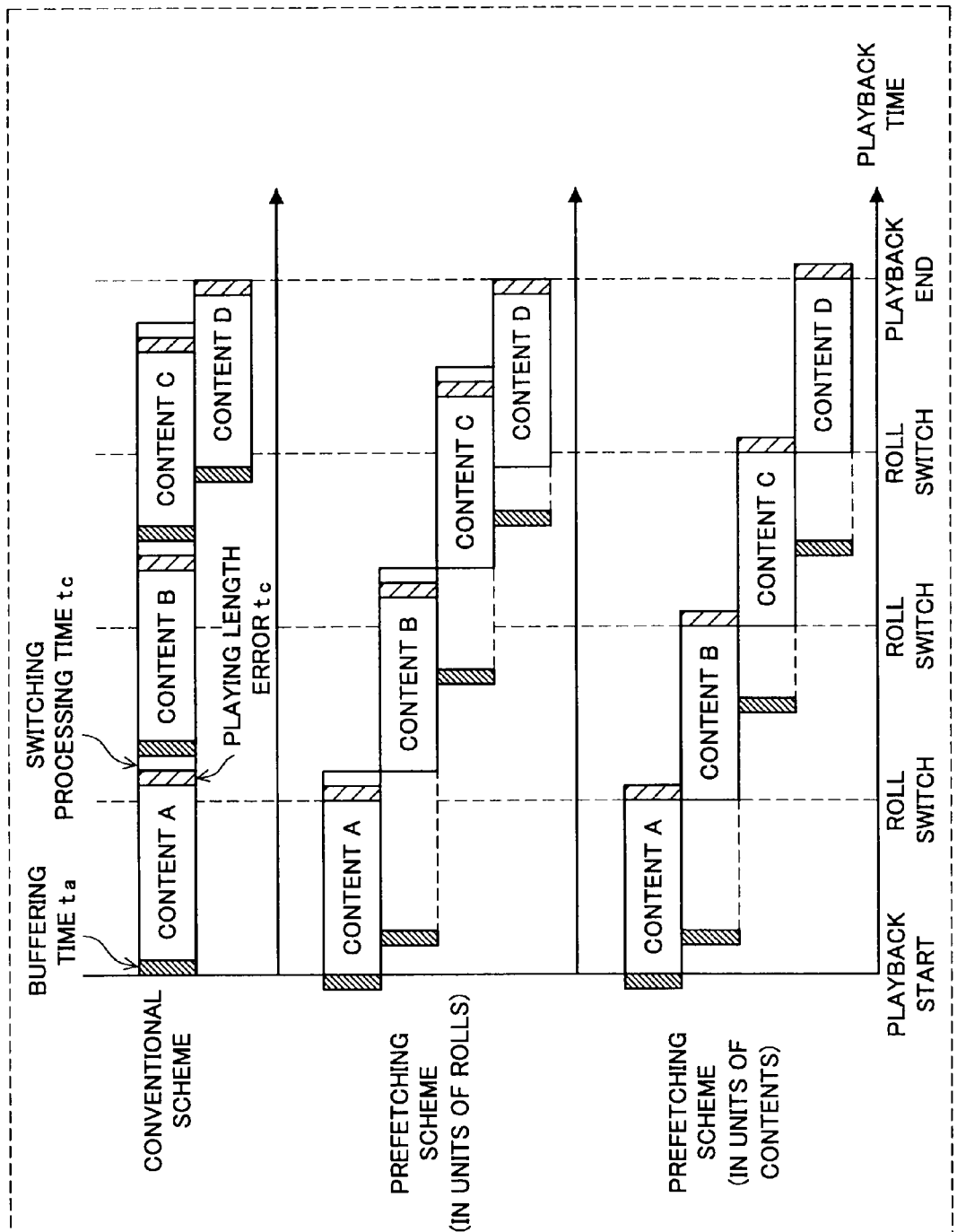
FIG. 8 is an explanatory diagram for describing an effect achieved by a multi-screen synchronized playback method according to the present embodiment.

Next, referring to FIG. 8, a prefetch processing method for data of content and an effect thereof will be described. FIG. 8 is an explanatory diagram showing the prefetch processing method according to the present embodiment.

FIG. 8(A) shows a conventional continuous playback scheme for a plurality of contents. FIG. 8(B) shows a continuous playback scheme for prefetching a plurality of contents in units of rolls. FIG. 8(C) shows a continuous playback scheme for prefetching a plurality of contents in units of contents. In each diagram of FIG. 8, the horizontal axis indicates the passing of playing time, and indicates playback processing time of content required from the playback start to the playback end according to each of the continuous playback schemes described above. Moreover, in FIG. 8, for the sake of convenience of explanation, a case where four contents (contents A, B, C, D) are continuously played back is shown as an example.

First, referring to FIG. 8(A), the conventional continuous playback scheme for a plurality of contents will be briefly described. As shown in FIG. 8(A), when playing back one content (for example, content A), buffering time ta is required before the content will be played back. Furthermore, as is already stated, time length of one content to be played back varies depending on playback processing capability of each display control terminal 200, and thus playback length error tb occurs, for example. Furthermore, when switching from one content to another content (for example, from content A to content B), as is already stated, depending on read processing capability or the like of each display control terminal 200, switching processing time tc occurs.

Referring to FIG. 8(A) while taking into account the structure of processing time required for content playback, according to the conventional scheme, buffering time ta occurs before content A is played back, playback length error tb occurs at the time of playback processing of content A, and content switching processing time tc occurs at the time of switching from content A to content B. Following content switching processing time tc of content A, buffering time ta is started for content B to be played back second, and after its completion, playback of content B is started. Playback processing of content C is similarly performed.

As a result, as a consequence of buffering time ta, playback length error tb and switching processing time tc accumulated in the playback processing of each content, playback end time of content D cannot be matched with playback end time of the continuous contents (contents A, B, C, D). Thus, the conventional scheme advances playback start time of content D to perform playback processing so that the playback end time of content D and the playback end time of the continuous contents are matched. However, according to this playback processing method, there arises a problem that a part of content C is not played back or a part or all of content D is not played back.

Thus, as shown in FIG. 8(B), the multi-screen synchronized playback system 1100 according to the present embodiment performs buffering of each content before the playback start time and moves buffering time ta to the middle of playback processing time of the previous content or therebefore to thereby avoid playback delay due to buffering time ta. This prefetch processing is mainly performed by the playback image reading section 216 described above. However, playback delay due to playback length error tb and switching processing time tc cannot be eliminated solely by the prefetch processing in units of rolls according to FIG. 8(B).

Thus, as shown in FIG. 8(C), the multi-screen synchronized playback system 1100 according to the present embodiment is configured so that, even during playback of the previous content, playback of the next content is started at a timing of roll switching time being reached. At this time, it is also possible to avoid playback delay due to buffering time to by using the prefetching scheme shown in FIG. 8(B) in combination. This switching processing is mainly performed by the timing control section 212 described above. By the application of this configuration, playback delay due to playback length error tb can be eliminated, and at the same time, switching processing time tc required for the switching processing can also be eliminated.

Heretofore, the prefetch processing method according to the present embodiment has been described. Since, by the application of the configuration described above, playback start times at which entity data of content is played back can be synchronized with higher accuracy, the application in combination with the time synchronization method described above enables to achieve a significant effect that multi-screen synchronized playback with higher accuracy can be realized. Furthermore, since it becomes possible to avoid a problem that content to be played back last or a part or all of the content to be previously played back is not played back, and thus, especially in a case of, for example, continuously playing back commercial image or the like, the provider of the commercial image as well as the broadcaster can expect commercial effect without feeling anxious.

Modified Example

Next, a modified example of the multi-screen synchronized playback system 1100 according to the present embodiment will be described. A characteristic of the modified example lies in a configuration of transmitting a playback start signal by multicast instead of the time information transmitted from the above-described synchronization server 100 to each display control terminal 200 by multicast. Thus, in the modified example, a synchronization server 500 is adopted instead of the synchronization server 100, and a display control terminal 600 is adopted instead of the display control terminal 200.

<Configuration of Synchronization Server 500>

Figure 9:
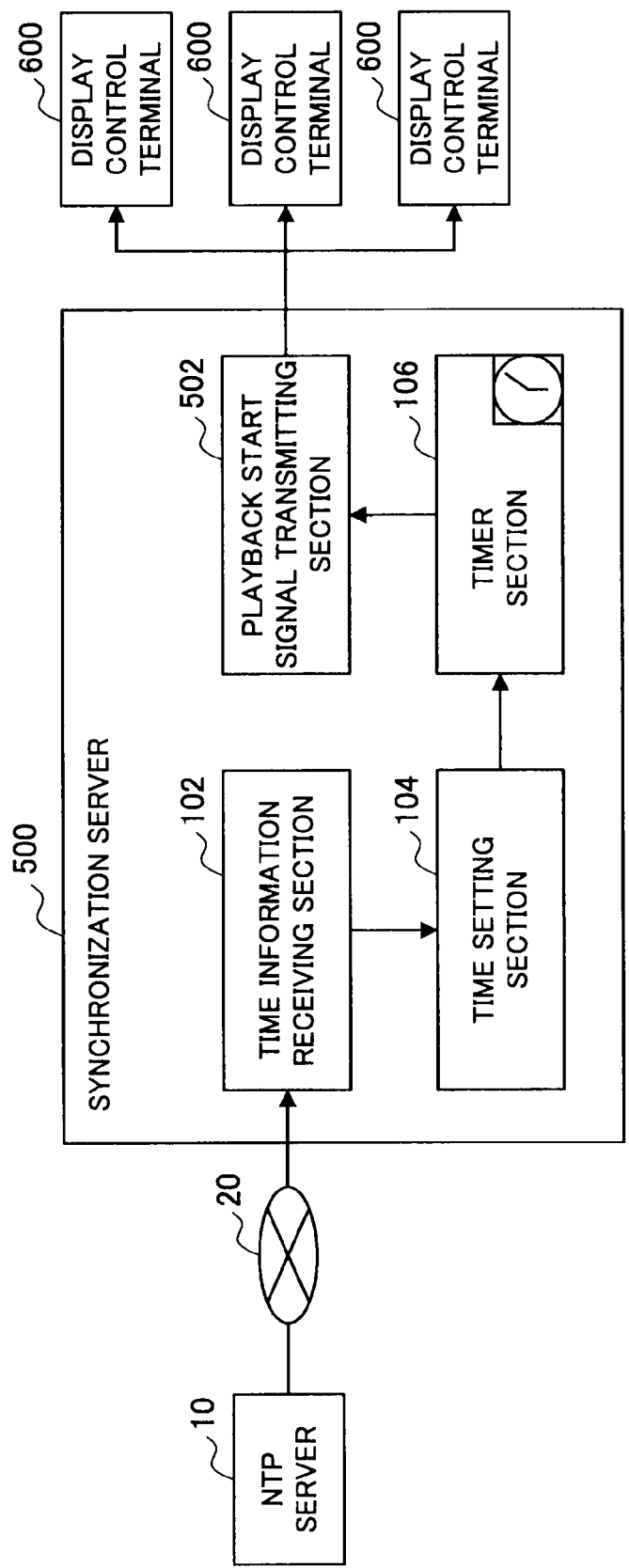
FIG. 9 is an explanatory diagram showing a functional configuration of a synchronization server according to a modified example of the present embodiment.

First, referring to FIG. 9, a functional configuration of the synchronization server 500 according to the modified example will be described. FIG. 9 is an explanatory diagram showing the functional configuration of the synchronization server 500 according to the modified example. Elements that are substantially the same as those of the synchronization server 100 described above will be denoted with the same reference numerals, and detailed explanation thereof will be omitted to thereby omit a repeated explanation.

As shown in FIG. 9, the synchronization server 500 is mainly configured from the time information receiving section 102, the time setting section 104, the timer section 106, and a playback start signal transmitting section 502. The characteristic lies particularly in a functional configuration of the playback start signal transmitting section 502. Thus, the configuration of the playback start signal transmitting section 502 will be described in detail.

(Playback Start Signal Transmitting Section 502)

The playback start signal transmitting section 502 transmits by multicast the playback start signal for notifying a plurality of display control terminals 600 of playback start time set for each content. The playback start signal transmitting section 502 can also transmit a content ID as the playback start signal, for example. Therefore, the synchronization server 500 is configured to include a playlist management section (not shown) for centrally managing a playlist of content held in the plurality of display control terminals 600 included in the multi-screen synchronized playback system 1100.

Furthermore, the playback start signal transmitting section 502 can transmit the playback start signal at a different timing for each channel. Furthermore, the playback start signal transmitting section 502 can also transmit the playback start signal, taking into account the buffering time of content described for the prefetch processing method described above. Also, the playback start signal transmitting section 502 can be configured to transmit the playback start signal prior to the playback start time by a predetermined period to start playback of the content after the predetermined period, instead of transmitting the playback start signal in synchronization with the playback start time. Furthermore, the playback start signal transmitting section 502 can transmit a playback start signal indicating that playback will be started before or after the predetermined period counting from a predetermined time.

By the application of a configuration allowing transmission of the playback start signal before the playback start time based on any of the methods described above, it becomes possible to transmit a plurality of playback start signals by the playback start time, and playback error due to arrival failure of the playback start signal can be suppressed.

<Configuration of Display Control Terminal 600>

Figure 10:
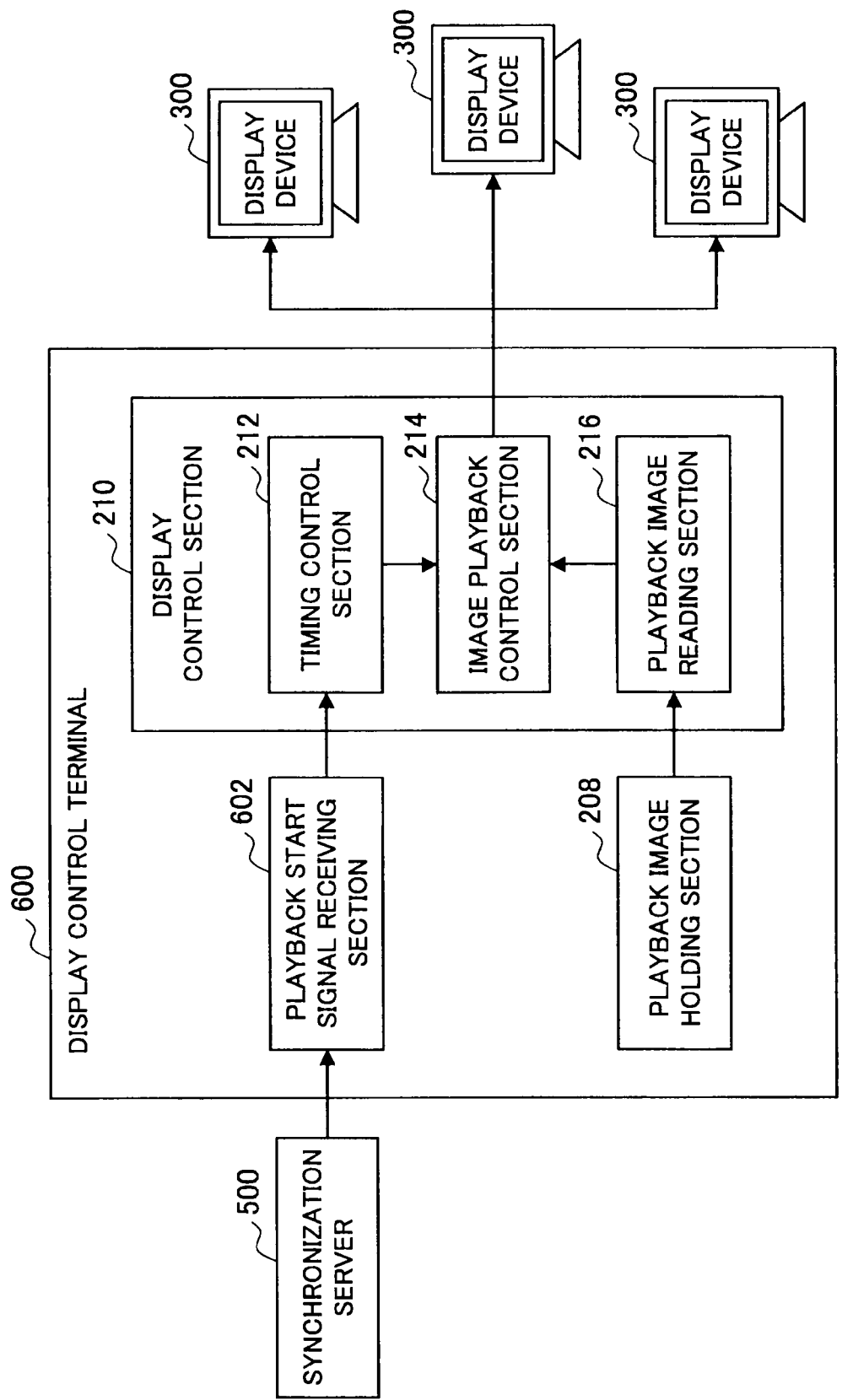
FIG. 10 is an explanatory diagram showing a functional configuration of a display control terminal according to the modified example of the present embodiment.

Next, by referring to FIG. 10, a functional configuration of the display control terminal 600 according to the modified example will be described. FIG. 10 is an explanatory diagram showing the functional configuration of the display control terminal 600 according to the modified example. Elements that are substantially the same as those of the display control terminal 200 described above will be denoted with the same reference numerals, and detailed explanation thereof will be omitted to thereby omit a repeated explanation.

As shown in FIG. 10, the display control terminal 600 is mainly configured from a playback start signal receiving section 602, the playback image holding section 208, and the display control section 210. Furthermore, the display control section 210 is mainly configured from the timing control section 212, the image playback control section 214, and the playback image reading section 216. However, the characteristic of the display control terminal 600 lies particularly in a functional configuration of the playback start signal receiving section 602 and the timing control section 212. Thus, the playback start signal receiving section 602 and the timing control section 212 will be described.

(Playback Start Signal Receiving Section 602)

The playback start signal receiving section 602 receives the playback start signal from the synchronization server 500, and transfers the same to the timing control section 212. The timing control section 212 notifies the image playback control section 214 of timing of playback start in accordance with the playback start signal transferred from the playback start signal receiving section 602. Thus, the timing control section 212 can notify the image playback control section 214 of playback start timing of content regardless of the time on a timer section of the display control terminal 600.

Furthermore, the playback start signal receiving section 602 can also realize a function substantially the same as the timer section 206 of the display control terminal 200 described above by, for example, receiving the playback start signal transmitted from the synchronization server 500 on a regular basis at a timing at which milliseconds digit and smaller digits become 0 every second, and transferring the same to the timing control section 212 with high accuracy. In a case of applying this configuration, the timing control section 212 has only to adopt a functional configuration substantially the same with the timing control section 212 included in the display control terminal 200 described above. Furthermore, the application of the configuration enables to avoid degradation of synchronization accuracy due to time error on the timer section 206 included in each display control terminal 200.

Second Embodiment

Next, a multi-screen synchronized playback system 1200 according to a second embodiment of the present invention will be described. Elements that are substantially the same as those of the multi-screen synchronized playback system 1100 described above will be denoted with the same reference numerals, and detailed explanation thereof will be omitted to thereby omit a repeated explanation. A characteristic of the present embodiment lies in a configuration where a display control terminal 400 having the functions of the synchronization server 100, 500 according to the first embodiment is provided within the multi-screen synchronized playback system 1200, and the synchronization server 100, 500 is not separately provided.

<Configuration of Multi-Screen Synchronized Playback System 1200>

Figure 11:
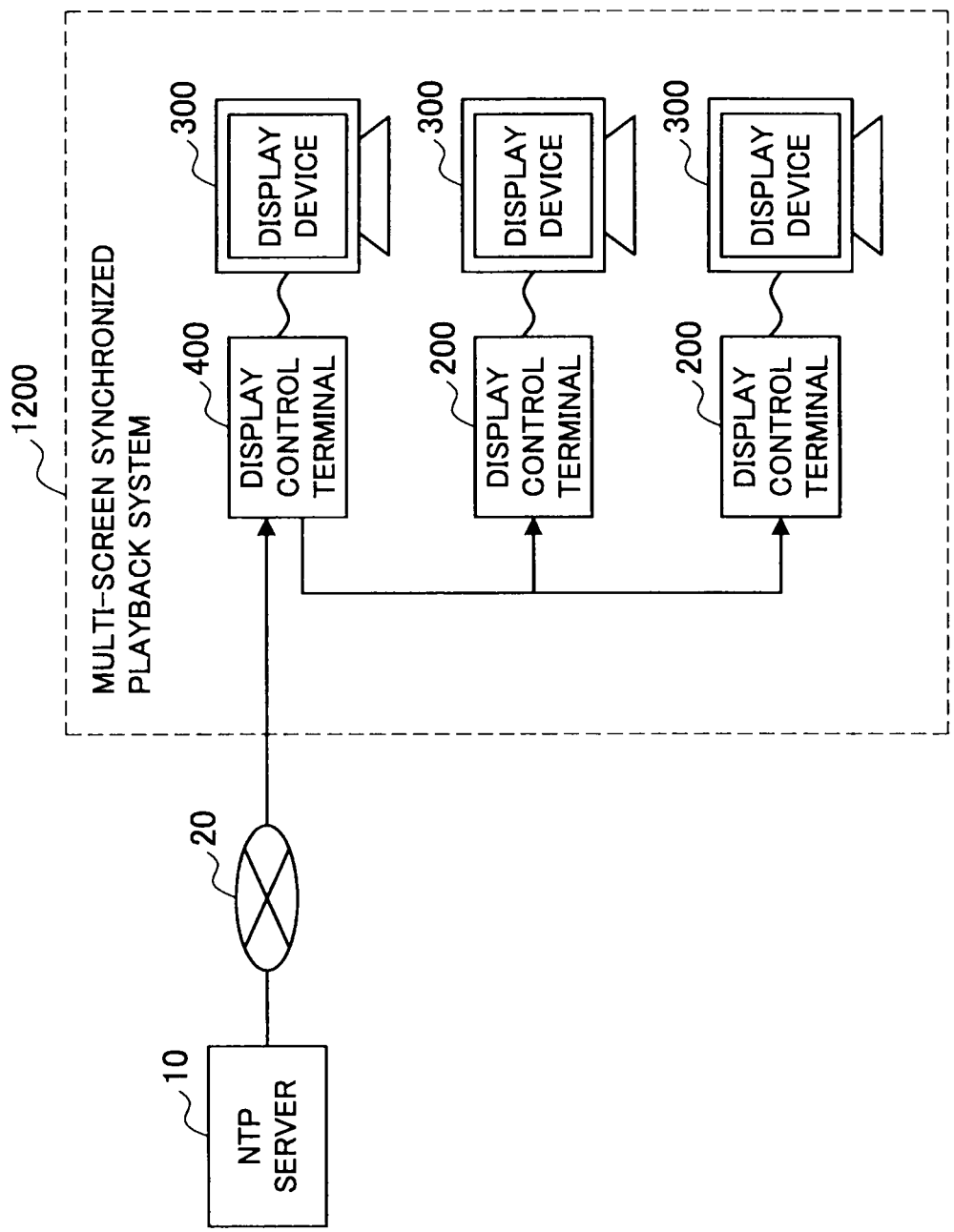
FIG. 11 is an explanatory diagram showing a configuration of a multi-screen synchronized playback system according to a second embodiment of the present invention.

First, referring to FIG. 11, a configuration of the multi-screen synchronized playback system 1200 according to the present embodiment will be described. FIG. 11 is an explanatory diagram showing the configuration of the multi-screen synchronized playback system 1200 according to the present embodiment.

As shown in FIG. 11, the multi-screen synchronized playback system 1200 is mainly configured from the display control terminal 400, a plurality of display control terminals 200, and a plurality of display devices 300. The characteristic lies particularly in a functional configuration of the display control terminal 400. Thus, the functional configuration of the display control terminal 400 will be described in detail.

(Display Control Terminal 400)

The display control terminal 400 is connected to the NTP server 10 via the network 20, and can set time on its own clock by receiving time information transmitted from the NTP server 10. Furthermore, the display control terminal 400 can transmit by multicast time information based on the time on its own clock to one or a plurality of other display control terminals 200 configuring the multi-screen synchronized playback system 1200. Furthermore, the display control terminal 400 is connected to one or a plurality of display devices 300, and can playback content on the display device 300 in synchronization with the one or plurality of other display control terminals 200.

In the following, the functional configuration of the display control terminal 400 will be described in detail.

<Display Control Terminal 400>

Figure 12:
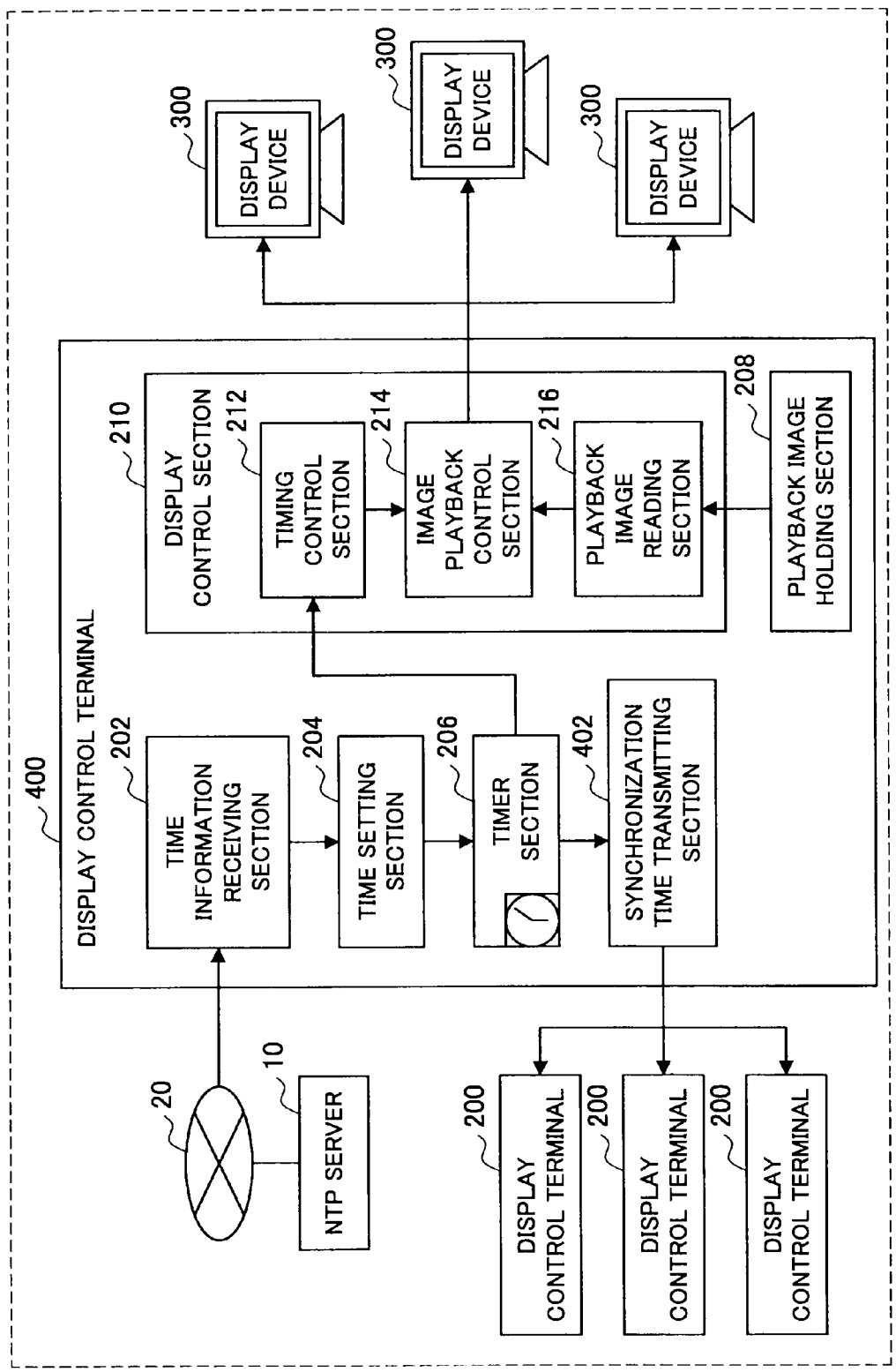
FIG. 12 is an explanatory diagram showing a functional configuration of a display control terminal according to the present embodiment.

Next, referring to FIG. 12, the functional configuration of the display control terminal 400 according to the present embodiment will be described. FIG. 12 is an explanatory diagram showing the functional configuration of the display control terminal 400 according to the present embodiment.

As shown in FIG. 12, the display control terminal 400 is mainly configured from the time information receiving section 202, the time setting section 204, the timer section 206, a synchronization time transmitting section 402, the display control section 210, and the playback image holding section 208. Furthermore, the display control section 210 is mainly configured from the timing control section 212, the image playback control section 214, and the playback image reading section 216. Moreover, the playback image reading section 216 may include the buffer memory 218 as with the display control terminal 200 according to the first embodiment described above. A characteristic of the display control terminal 400 lies in a functional configuration of the synchronization time transmitting section 402. Thus, the functional configuration of the synchronization time transmitting section 402 will be described.

(Synchronization Time Transmitting Section 402)

The synchronization time transmitting section 402 is connected to the one or plurality of display control terminals 200 configuring the multi-screen synchronized playback system 1200. The synchronization time transmitting section 402 generates time information based on the time on the timer section 206 included in the display control terminal 400, and transmits by multicast the time information to the one or plurality of display control terminals 200 configuring the multi-screen synchronized playback system 1200. Accordingly, the functional configuration of the synchronization time transmitting section 402 is substantially the same as that of the synchronization time transmitting section 108 of the synchronization server 100 according to the first embodiment described above.

Heretofore, the configuration of the multi-screen synchronized playback system 1200 according to the present embodiment has been described. By the application of the configuration described above, a multi-screen synchronized playback synchronized with high accuracy can be realized, and also, since servers to be installed can be reduced compared to the multi-screen synchronized playback system 1100 according to the first embodiment described above, from the viewpoints of installation cost, management/operation costs, installation space, and the like, a multi-screen synchronized playback can be realized at a lower cost. Moreover, taking into account the load relating to time synchronization, the display control terminal 400 can be configured to be connected to lesser number of display devices 300 compared to other display control terminals 200.

Although a preferred embodiment of the present invention is described with reference to the drawings, the present invention is not limited thereto as a matter of course. It will be obvious to those skilled in the art that various changes and modifications may be made without departing from the scope of the claims and thus are intended for inclusion within the technological scope of the present invention.

Although, in the multi-screen synchronized playback system according to each embodiment described above, a standard timer of an operating system is implied as the configuration of the timer section (clock) provided in each display control terminal, a configuration is also possible which uses a multimedia timer allowing for higher accuracy instead of the standard timer of the operating system, for example. With this configuration, error occurring at the timer until time synchronization is performed can be suppressed, and moreover, since it becomes needless to perform time synchronization frequently, multi-screen synchronized playback with higher accuracy can be realized. Furthermore, a configuration which combines the configurations of the first and second embodiments described above (modified example included) is intended for inclusion within the technological scope of the present invention as a matter of course.

The invention claimed is:

1. A multi-screen synchronized playback system comprising:
    a plurality of display control terminals; and
    a synchronization server connected to the plurality of display control terminals, wherein:
    the synchronization server including:
        a synchronization time transmitting section that simultaneously transmits time information of a clock of the synchronization server to the plurality of display control devices, and
    each display control terminal including:
        a time setting section that sets a time on a clock of the display control terminal based on the time information simultaneously transmitted from the synchronization server, and
        a display control section that starts playback of content at a different playback start time set for each content from a plurality of contents based on the time on the clock of the display control terminal, the different playback start times for each content providing a sequential playback of the plurality of contents on a plurality of display devices.

2. The multi-screen synchronized playback system according to claim 1, wherein:
    the synchronization server further includes a time setting section that sets a time on the clock of the synchronization server based on time information received via a network.

3. The multi-screen synchronized playback system according to claim 2, wherein:
    the time setting section provided in the synchronization server sets time on the clock of the synchronization server based on time information received from an NTP server located on the network.

4. The multi-screen synchronized playback system according to claim 1, wherein:
    the display control section provided in the display control terminal simultaneously starts playback of content which is the same as content whose playback is started by another display control terminal included in the multi-screen synchronized playback system.

5. The multi-screen synchronized playback system according to claim 1, wherein:
    the display control section provided in the display control terminal prefetches, before a playback start time set for each content is reached, content corresponding to the playback start time.

6. The multi-screen synchronized playback system according to claim 1, wherein:
    the display control section provided in the display control terminal ends content being played back and starts playback of content to be played back next at a time point a playback start time of the content to be played back next after the content being played back is reached.

7. A multi-screen synchronized playback system comprising:
    a plurality of first display control terminals; and
    a second display control terminal connected to the plurality of first display control terminals, wherein:
    the second display control terminal including:
        a display control section that starts playback of content at a playback start time set for each content based on a time on a clock of the second display control terminal, and
        a synchronization time transmitting section that simultaneously transmits time information of the clock of the second display control terminal to the plurality of first display control devices, and each first display control terminal including:
a time setting section that sets a time on a clock of the first display control terminal based on the time information simultaneously transmitted from the second display control terminal, and
a display control section for starting playback of content at the playback start time set for each content based on the time on the clock of the first display control terminal.

8. A display control terminal connected to the plurality of other display control terminals, the display control terminal comprising:
a display control section that starts playback of content at a different playback start time set for each content from a plurality of contents based on a time on a clock of the display control terminal, the different playback start times for each content providing a sequential playback of the plurality of contents on a plurality of display devices; and
a synchronization time transmitting section that simultaneously transmits time information of the clock of the display control terminal to the plurality of other display control devices to synchronize the time on the clock of the display control terminal and a time on clocks of the plurality of other display control terminals.

9. A multi-screen synchronized playback system comprising:
a plurality of display control terminals; and
a synchronization server connected to the plurality of display control terminals, wherein:
the synchronization server including:
a playback start signal transmitting section that simultaneously transmits a playback start signal for each content from a plurality of contents to the plurality of display control devices at a different playback start time set for each content based on a time on a clock of the synchronization server, the different playback start times for each content providing a sequential playback of the plurality of contents on a plurality of display devices; and
the display control terminal including:
a display control section that starts playback of corresponding content in accordance with the playback start signal received from the synchronization server.

10. A multi-screen synchronized playback system comprising:
a plurality of first display control terminals; and
a second display control terminal connected to the plurality of first display control terminals, wherein:
the second display control terminal including:
a display control section that starts playback of content at a playback start time set for each content based on a time on a clock of the second display control terminal, and
a playback start signal transmitting section that simultaneously transmits a playback start signal for each content to the plurality of first display control devices at the playback start time set for each content based on the time on the clock of the second display control terminal, and
the first display control terminal including
a display control section that starts playback of corresponding content in accordance with the playback start signal received from the second display control terminal.

11. A display control terminal connected to a plurality of other display control terminals, the display control terminal comprising:
a display control section that starts playback of content at a different playback start time set for each content from a plurality of contents based on a time on a clock of the display control terminal, the different playback start times for each content providing a sequential playback of the plurality of contents on a plurality of display devices; and
a playback start signal transmitting section that simultaneously transmits a playback start signal for each content to the plurality of other display control devices at the playback start time set for each content based on the time on the clock of the display control terminal.

12. A multi-screen synchronized playback system comprising:
a plurality of display control terminals; and
a synchronization server connected to the plurality of display control terminals, wherein:
the synchronization server including:
a playback start signal transmitting section that simultaneously transmits time information to the plurality of display control devices at a predetermined time interval based on a time on a clock of the synchronization server, and
the display control terminal includes:
a display control section that starts playback of content at a different playback start time set for each content from a plurality of contents based on the time information received from the synchronization server, the different playback start times for each content providing a sequential playback of the plurality of contents on a plurality of display devices.

13. A multi-screen synchronized playback system comprising:
a plurality of first display control terminals and a second display control terminal connected to the plurality of first display control terminals, wherein:
the second display control terminal including:
a display control section that starts playback of content at a different playback start time set for each content from a plurality of contents based on time on a clock of the second display control terminal, the different playback start times for each content providing a sequential playback of the plurality of contents on a plurality of display devices, and
a playback start signal transmitting section that simultaneously transmits time information to the plurality of first display control devices at a predetermined time interval based on the time on the clock of the second display control terminal, and
the first display control terminal including:
a display control section that starts playback of content at the playback start time set for each content based on the time information received from the second display control terminal.

14. A display control terminal connected to a plurality of other display control terminals, the display control terminal comprising:
a display control section that starts playback of content at a different playback start time set for each content from a plurality of contents based on a time on a clock of the display control terminal, the different playback start times for each content providing a sequential playback of the plurality of contents on a plurality of display devices; and a playback start signal transmitting section that simultaneously transmits time information to the plurality of other display control devices at a predetermined time interval based on the time on the clock of the display control terminal.

15. A multi-screen synchronized playback method of a multi-screen synchronized playback system having a plurality of display control terminals and a synchronization server connected to the plurality of display control terminals, the method comprising steps of:
- a synchronization time transmitting step of simultaneously transmitting, by the synchronization server, time information of a clock of the synchronization server to the plurality of display control devices;
- a time setting step of setting, by the display control terminal, a time on a clock of the display control terminal based on the time information simultaneously transmitted from the synchronization server; and
- a display control step of starting playback of content at a different playback start time set for each content from a plurality of contents based on the time on the clock of the display control terminal, the different playback start times for each content providing a sequential playback of the plurality of contents on a plurality of display devices.

16. A non-transitory computer readable storage medium having instructions stored therein, which when executed by a process causes the processor to execute the multi-screen synchronized playback method according to claim 15.

17. A multi-screen synchronized playback method of a multi-screen synchronized playback system having a plurality of first display control terminals and a second display control terminal connected to the plurality of first display control terminals, the method comprising steps of:
- a display control step of starting, by the second display control terminal, playback of content at a playback start time set for each content based on a time on a clock of the second display control terminal;
- a synchronization time transmitting section for simultaneously transmitting, by the second display control terminal, time information of the clock of the second display control terminal to the plurality of first display control devices;
- a time setting step of setting, by the first display control terminal, time on a clock of the first display control terminal based on the time information simultaneously transmitted from the second display control terminal; and
- a display control step of starting, by the first display control terminal, playback of content at a playback start time set for each content, based on the time on the clock of the first display control terminal.

18. A multi-screen synchronized playback method of a multi-screen synchronized playback system having a plurality of display control terminals and a synchronization server connected to the plurality of display control terminals, the method comprising steps of:
- a playback start signal transmitting step of simultaneously transmitting, by the synchronization server, a playback start signal for each content to the plurality of display control devices at a different playback start time set for each content from a plurality of contents based on time on a clock of the synchronization server, the different playback start times for each content providing a sequential playback of the plurality of contents on a plurality of display devices; and
- a display control step of starting, by the display control terminal, playback of corresponding content in accordance with the playback start signal received from the synchronization server.

19. A multi-screen synchronized playback method of a multi-screen synchronized playback system having a plurality of first display control terminals and a second display control terminal connected to the plurality of first display control terminals, the method comprising steps of:
- a display control step of starting, by the second display control terminal, playback of content at a playback start time set for each content based on a time on a clock of the second display control terminal;
- a playback start signal transmitting step of simultaneously transmitting, by the second display control terminal, a playback start signal for each content to the plurality of first display control devices at the playback start time set for each content, based on the time on the clock of the second display control terminal; and
- a display control step of starting, by the first display control terminal, playback of corresponding content in accordance with the playback start signal received from the second display control terminal.

20. A multi-screen synchronized playback method of a multi-screen synchronized playback system having a plurality of display control terminals and a synchronization server connected to the plurality of display control terminals, the method comprising steps of:
- a playback start signal transmitting step of simultaneously transmitting, by the synchronization server, time information to the plurality of display control devices at a predetermined time interval, based on time on a clock of the synchronization server; and
- a display control step of starting, by the display control terminal, playback of content at a different playback start time set for each content from a plurality of contents based on the time information received from the synchronization server, the different playback start times for each content providing a sequential playback of the plurality of contents on a plurality of display devices.

21. A multi-screen synchronized playback method of a multi-screen synchronized playback system having a plurality of first display control terminals and a second display control terminal connected to the plurality of first display control terminals, the method comprising steps of:
- a display control step of starting, by the second display control terminal, playback of content at a playback start time set for each content, based on time on a clock of the second display control terminal;
- a playback start signal transmitting step of simultaneously transmitting, by the second display control terminal, time information to the plurality of first display control devices at a predetermined time interval based on the time on the clock of the second display control terminal; and
- a display control step of starting, by the first display control terminal, playback of content at the playback start time set for each content, based on the time information received from the second display control terminal.

* * * * *